(12) United States Patent
Fan et al.

(10) Patent No.: US 11,788,606 B2
(45) Date of Patent: Oct. 17, 2023

(54) TRANSMISSION MECHANISM

(71) Applicant: Ningbo HS-Power Drive Technology Co. Ltd, Zhejiang (CN)

(72) Inventors: Zhengfu Fan, Zhejiang (CN); Yuhao Chen, Zhejiang (CN)

(73) Assignee: Ningbo HS-Power Drive Technology Co. Ltd, Zhejing (CN)

( * ) Notice: Subject to any disclaimer, the term of this patent is extended or adjusted under 35 U.S.C. 154(b) by 0 days.

(21) Appl. No.: 17/907,862

(22) PCT Filed: Dec. 28, 2020

(86) PCT No.: PCT/IB2020/062474
§ 371 (c)(1),
(2) Date: Aug. 29, 2022

(87) PCT Pub. No.: WO2021/214541
PCT Pub. Date: Oct. 28, 2021

(65) Prior Publication Data
US 2023/0128685 A1    Apr. 27, 2023

(30) Foreign Application Priority Data

Apr. 20, 2020 (CN) .......................... 202010311344.X
Aug. 4, 2020 (CN) .......................... 202021597579.1
Aug. 4, 2020 (CO) .......................... 202010774581.X

(51) Int. Cl.
*F16H 1/32* (2006.01)
*F16H 1/46* (2006.01)

(52) U.S. Cl.
CPC ................. *F16H 1/46* (2013.01); *F16H 1/32* (2013.01); *F16H 2001/327* (2013.01)

(58) Field of Classification Search
CPC ........ F16H 1/46; F16H 1/32; F16H 2001/327; F16H 2001/323; F16H 2001/325
See application file for complete search history.

(56) References Cited

U.S. PATENT DOCUMENTS 3,129,611 A * 4/1964 Lee ........................... F16H 1/46
475/179
4,898,065 A * 2/1990 Ogata ....................... F16H 1/32
475/179

(Continued)

FOREIGN PATENT DOCUMENTS

CN    103026103 A  *  4/2013  ........... B60K 17/046
CN    110873153 A      3/2020

(Continued)

OTHER PUBLICATIONS

International Search Report issued by ISA/EPO in connection with PCT/IB2020/062474 dated Mar. 10, 2021.

*Primary Examiner* — Sherry L Estremsky
(74) *Attorney, Agent, or Firm* — Levenfeld Pearlstein, LLC

(57) ABSTRACT

Disclosed in the present invention is a transmission mechanism, comprising an outer wheel, an inner wheel, an eccentric shaft, a first flange body, a rotating shaft and a planetary gear device. The inner wheel is provided in the outer wheel and is engaged with the outer wheel. The eccentric shaft can rotate around a central axis; an eccentric portion, eccentric shaft outer teeth and a first support portion are provided on the periphery of the eccentric shaft; and the inner wheel is provided around the eccentric portion. The first flange body and the inner wheel are provided side by side, and the first flange body is provided around the first support portion. The rotating shaft has rotating shaft external teeth. The planetary gear device is supported by the first flange body, and a first row of planetary teeth engaged with the rotating shaft outer teeth and a second row of planetary teeth engaged with the eccentric shaft outer teeth are provided at the periphery of (Continued)

the planetary gear device. The transmission mechanism can provide a wide range of speed ratios and reduce production costs.

9 Claims, 17 Drawing Sheets

(56) References Cited

U.S. PATENT DOCUMENTS

| | | | | |
|---|---|---|---|---|
| 7,811,193 | B2 * | 10/2010 | Nakamura | F16H 1/46 |
| | | | | 475/179 |
| 8,858,383 | B2 * | 10/2014 | Nishioka | F16H 1/32 |
| | | | | 475/170 |
| 9,121,479 | B2 * | 9/2015 | Zhang | F16H 1/46 |
| 9,321,172 | B2 * | 4/2016 | Johnson | H02K 11/25 |
| 2004/0192486 | A1 | 9/2004 | Tsurumi et al. | |

FOREIGN PATENT DOCUMENTS

| | | | |
|---|---|---|---|
| DE | 102012023988 A1 | 6/2013 | |
| DE | 102019123182 A1 | 4/2020 | |
| EP | 3483473 A1 * | 5/2019 | F16H 1/32 |

\* cited by examiner

TRANSMISSION MECHANISM

TECHNICAL FIELD

The present application relates to a transmission mechanism, and more specifically relates to an internal engagement transmission mechanism.

BACKGROUND ART

In a conventional internal engagement transmission mechanism, a rotating shaft is disposed in an eccentric shaft, and thus the rotating shaft directly drives the eccentric shaft to rotate by means of the engagement of the external teeth of the rotating shaft and the internal teeth of the eccentric shaft. Although such driving method is simple in structure, it is inconvenient to machining due to the arrangement of the internal teeth in the eccentric shaft. Especially for a transmission mechanism with a small size, since the space of the hollow cavity in the eccentric shaft is small, it is difficult to process the internal teeth of the eccentric shaft.

SUMMARY OF THE INVENTION

The exemplary embodiment of this application can solve at least some problems mentioned above. For example, the application provides a transmission mechanism. The transmission mechanism comprises an outer wheel, an inner wheel, an eccentric shaft, a first flange, a rotating shaft and at least one planetary gearing device. The inner wheel is disposed in the outer wheel. The inner wheel is able to engage with the outer wheel. The eccentric shaft is capable of rotating around a central axis. The periphery of the eccentric shaft is provided with eccentric portions. The eccentric shaft external teeth and a first supporting portion, and the inner wheel are disposed around the eccentric portions such that the rotation of the eccentric shaft is capable of drive the inner wheel to rotate eccentrically or such that the eccentric rotation of the inner wheel is capable of drive the eccentric shaft to rotate. The first flange and the inner wheel are arranged side by side, and the first flange is disposed around the first supporting portion. The rotating shaft has rotating shaft external teeth. The at least one planetary gearing device is supported by the first flange. The periphery of each of the at least one planetary gearing device is provided with a first row of planetary teeth and a second row of planetary teeth. The first row of planetary teeth engage with the rotating shaft external teeth, and the second row of planetary teeth engage with the eccentric shaft external teeth.

According to the transmission mechanism described above, the transmission mechanism is configured such that, when power is input via the rotating shaft, the rotation of the eccentric shaft is capable of drive the inner wheel to rotate eccentrically, and output power via the first flange; or the outer wheel or the transmission mechanism is configured such that, when power is input via the first flange or the outer wheel, the eccentric rotation of the inner wheel is capable of drive the eccentric shaft to rotate, and output power via the rotating shaft.

According to the transmission mechanism described above, the first flange comprises at least one supporting hole. The at least one planetary gearing device is capable of being rotatably supported on the first flange via the at least one supporting hole.

According to the transmission mechanism described above, the periphery of the eccentric shaft is provided with a second supporting portion. The inner wheel is provided with at least two inner wheel through-holes. The transmission mechanism further comprises a second flange and at least two connection and transfer components. The first flange and the second flange are respectively arranged on opposite sides of the inner wheel, and the second flange is disposed around the second supporting portion. The each of the at least two connection and transfer components penetrates a corresponding one of the at least two inner wheel through-holes in the inner wheel, and the first flange and the second flange on opposite sides of the inner wheel are connected together. The eccentric portions of the eccentric shaft are arranged between the first flange and the second flange.

According to the transmission mechanism described above, each of the at least one planetary gearing device further comprises a planetary gear supporting portion, a first planetary gear and a second planetary gear. The first planetary gear is connected to the second planetary gear via the planetary gear supporting portion. The first row of planetary teeth and the second row of planetary teeth are respectively disposed on the first planetary gear and the second planetary gear.

According to the transmission mechanism described above, the first row of planetary teeth and the second row of planetary teeth are arranged on two sides of the supporting hole.

According to the transmission mechanism described above, the first flange comprises at least one planetary gearing accommodation portion. The at least one planetary gearing accommodation portion is disposed around a corresponding one of the at least one supporting hole to accommodate the second planetary gear.

According to the transmission mechanism described above, the first planetary gear and the second planetary gear are disposed at two ends of the planetary gear supporting portion.

According to the transmission mechanism described above, the first row of planetary teeth and the second row of planetary teeth are disposed on the same side of the first flange, and the second row of planetary teeth are closer to the first flange than the first row of planetary teeth. The first flange comprises an eccentric shaft accommodation portion penetrating the first flange. The eccentric shaft passes through the eccentric shaft accommodation portion such that the eccentric shaft external teeth are disposed on the same side of the first flange as the first row of planetary teeth and the second row of planetary teeth.

The transmission mechanism of this application transmit power between the rotating shaft and the eccentric shaft via at least one planetary gearing device, and the at least one planetary gearing device, the rotating shaft and the eccentric shaft are provided with external teeth, so as to provide a large range of speed ratio while reduce the producing cost.

Other features, advantages and embodiments of the present application may be elaborated or become apparent by considering the following specific embodiments, accompanying drawings and claims. Furthermore, it should be appreciated that the summary and the following specific embodiments are all exemplary, and are intended to provide a further explanation, but not to limit the scope of protection of the present application. However, the specific embodiments and specific examples merely indicate preferred embodiments of the present application. For those skilled in the art, various variations and modifications within the spirit and scope of the present application will become apparent by the way of the specific embodiments.

BRIEF DESCRIPTION OF THE DRAWINGS

These and other features and advantages of the present application may be better understood by reading the following detailed description with reference to the accompanying drawings. In all the accompanying drawings, the same reference numerals represent the same parts, in the figures.

DETAILED DESCRIPTION OF EMBODIMENTS

Figure 1A:
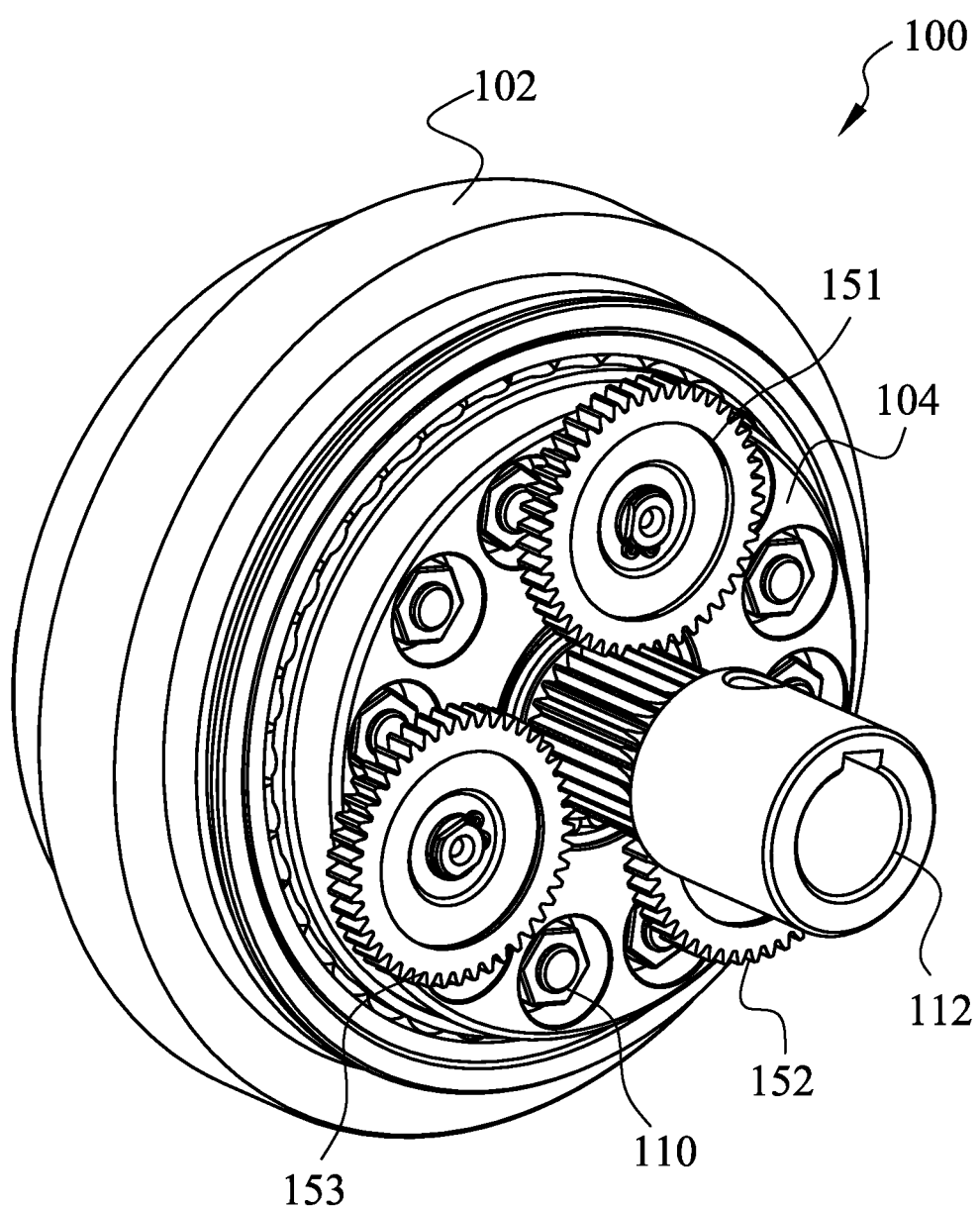
FIG. 1A is a perspective view of an embodiment of a transmission mechanism according to the present application as seen from right to left.

Particular embodiments of the present application are described below with reference to the accompanying drawings which constitute part of this description. It should be appreciated that although the terms, such as "left" and "right", and "outer" and "inner", indicating orientations are used in the present application to describe various exemplary structural parts and elements in the present application, these terms used herein are, in order to facilitate illustration, only determined based on the exemplary orientations as shown in the accompanying drawings. Since the embodiments disclosed in the present application can be arranged in different directions, these terms indicating directions are only illustrative and should not be considered as limitations. In the following accompanying drawings, the same reference numerals are used for the same components.

In a transmission mechanism 100 in the present application, a rotating shaft 112, an outer wheel 102, and a first flange 104 and a second flange 106 connected together can move in a relative motion, such that power is output via the transmission mechanism 100, and the transmission mechanism 100 can achieve the purpose of speed reduction or speed increase. When the rotating shaft 112 serves as a power input component (i.e., connected to a driving component) and the transmission mechanism 100 needs to realize speed reduction, the outer wheel 102 may be fixed, and the first flange 104 and/or the second flange 106 serves as a power output component (i.e., connected to a driven component), or the first flange 104 and the second flange 106 are fixed, and the outer wheel 102 serves as a power output component. When the outer wheel 102 serves as a power input component and the transmission mechanism 100 needs to realize speed increase, the first flange 104 and the second flange 106 may be fixed, and the rotating shaft 112 serves as a power output component. When the first flange 104 and/or the second flange 106 serves as a power input component and the transmission mechanism 100 needs to realize speed increase, the outer wheel 102 may be fixed, and the rotating shaft 112 serves as a power output component. In order to facilitate description, an example in which the rotating shaft 112 serves as a power input component, the outer wheel 102 is fixed, and the second flange 106 serves as a power output component so as to realize speed reduction will be described below.

Figure 1B:
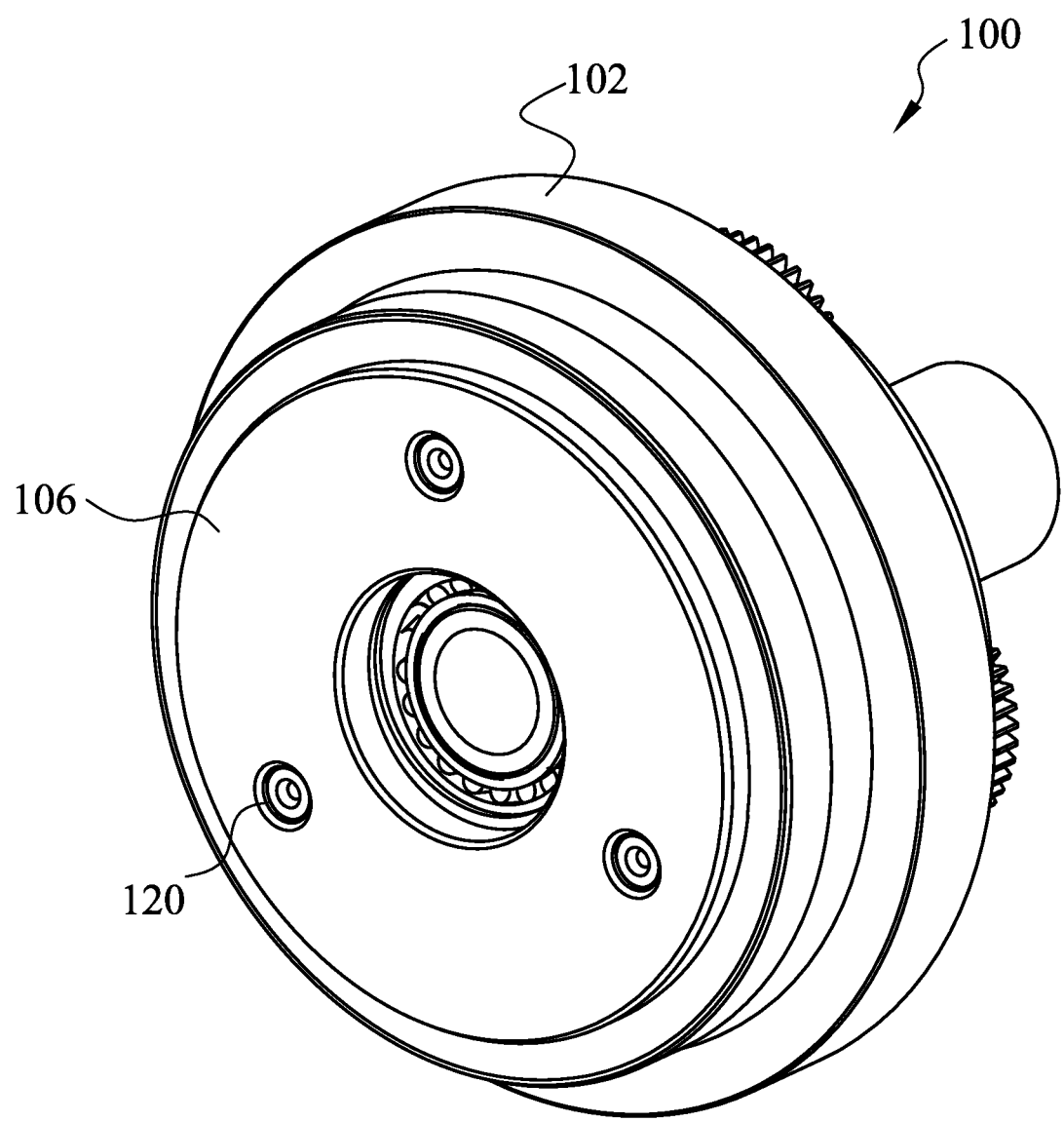
FIG. 1B is a perspective view of the transmission mechanism shown in FIG. 1A as seen from left to right.
Figure 1C:
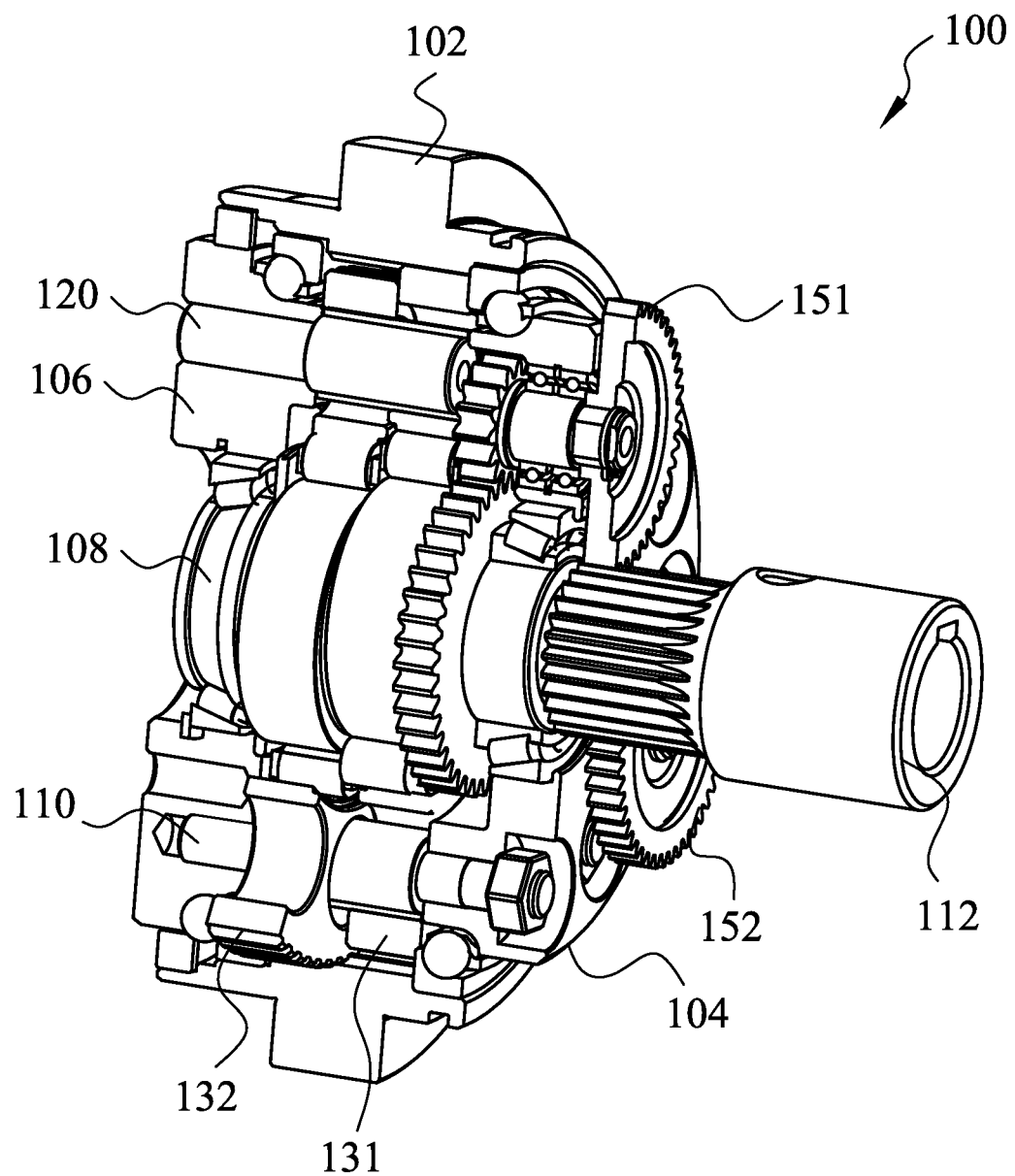
FIG. 1C is a cross-sectional view of the transmission mechanism shown in FIG. 1A.

FIG. 1A is a perspective view of an embodiment of the transmission mechanism 100 according to the present application as seen from right to left. FIG. 1B is a perspective view of the transmission mechanism 100 shown in FIG. 1A as seen from left to right. FIG. 1C is a cross-sectional view of the transmission mechanism shown in FIG. 1A to show more components in the transmission mechanism 100. As shown in FIGS. 1A-1C, the transmission mechanism 100 comprises an outer wheel 102, a first flange 104, a second flange 106, a first inner wheel 131, a second inner wheel 132, a connection and transfer component 110, an auxiliary transfer component 120, an eccentric shaft 108, planetary gearing device 151, 152, 153, and a rotating shaft 112. The first inner wheel 131, the second inner wheel 132, the first flange 104 and the second flange 106 are disposed side by side, and are carried or supported by the outer wheel 102. The first flange 104 and the second flange 106 are respectively arranged on two sides of the first inner wheel 131 and the second inner wheel 132, and are rigidly connected together via the connection and transfer component 110. The connection and transfer component 110 passes through the first flange 104, the first inner wheel 131, the second inner wheel 132 and the second flange 106 so as to hold the first inner wheel 131 and the second inner wheel 132 between the first flange 104 and the second flange 106. The auxiliary transfer component 120 passes through the first inner wheel 131, the second inner wheel 132 and the second flange 106. The planetary gearing device 151, 152, 153 are disposed on the first flange 104. The eccentric shaft 108 penetrates the first flange 104, the second flange 106, the first inner wheel 131 and the second inner wheel 132, and can engage with the planetary gearing device 151, 152, 153. The rotating shaft 112 is disposed on the right side of the eccentric shaft 108, and also engages with the planetary gearing device 151, 152, 153.

When the transmission mechanism 100 is in operation, the power transfer relationship thereof is substantially described as follows.

The rotating shaft 112 engages with the planetary gearing device 151, 152, 153 so as to drive the planetary gearing device 151, 152, 153 to rotate. The planetary gearing device 151, 152, 153 engage with the eccentric shaft 108 so as to drive the eccentric shaft 108 to rotate. The eccentric shaft 108 can drive the first inner wheel 131 and the second inner wheel 132 to rotate. The connection and transfer component 110 and the auxiliary transfer component 120 transfer the motion of the first inner wheel 131 and the second inner wheel 132 to the first flange 104 and the second flange 106 to drive the first flange 104 and the second flange 106 to rotate. The first flange 104 and the second flange 106 are connected to a driven component (not shown) so as to achieve speed change and torque output.

The specific structure of each component in the transmission mechanism 100 will be described in detail below with reference to FIGS. 2A-11B.

Figure 2A:
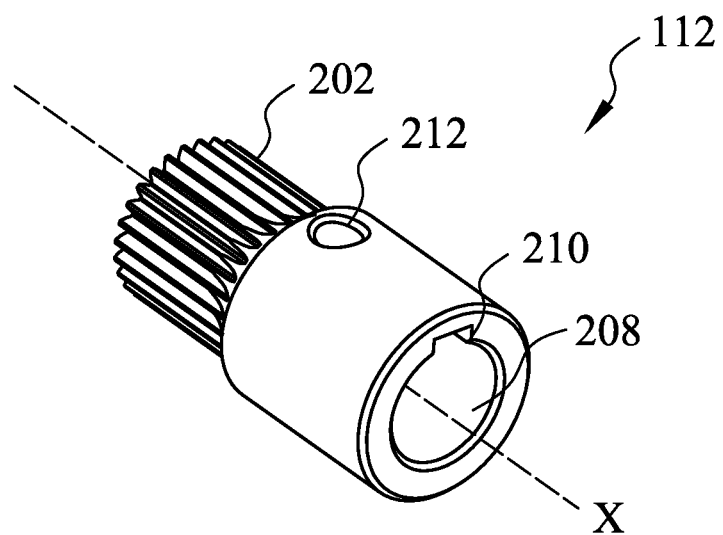
FIG. 2A is a perspective view of a rotating shaft of the transmission mechanism shown in FIG. 1C as seen from right to left.
Figure 2B:
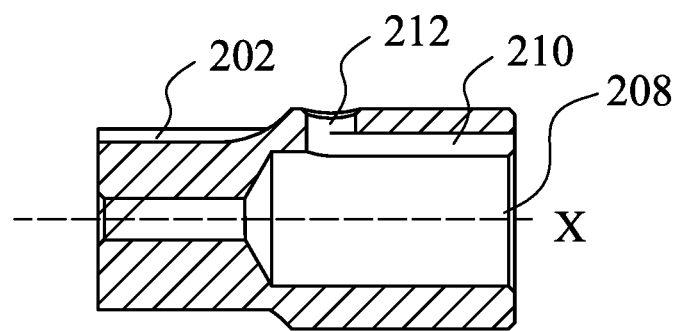
FIG. 2B is an axial cross-sectional view of the rotating shaft shown in FIG. 2A.

FIG. 2A is a perspective view of the rotating shaft 112 of the transmission mechanism 100 shown in FIG. 1C as seen from right to left. FIG. 2B is an axial cross-sectional view of the rotating shaft 112 shown in FIG. 2A to show the specific structure of the rotating shaft 112. As shown in FIGS. 2A-2B, the rotating shaft 112 is substantially cylindrical and has a central axis X. The circumferential face of the left end of the rotating shaft 112 is provided with rotating shaft external teeth 202 for engaging with a first row of planetary teeth 411 of the planetary gearing device 151, 152, 153 (see FIGS. 4A-4B). The rotating shaft 112 is internally provided with an internal accommodation portion 208 and a fastener receiving portion 212. The internal accommodation portion 208 is formed by extending inward from the right side of the rotating shaft 112 and is used for receiving an output component of a driving component (e.g., a rotating shaft of a motor). The internal accommodation portion 208 also has a central axis X. The internal accommodation portion 208 is provided with a key slot 210 on one side to prevent the output end of the driving component from rotating around the central axis X relative to the rotating shaft 112. The rotating shaft 112 is further internally provided with a fastener receiving portion 212 for receiving a fastener. The fastener receiving portion 212 is disposed perpendicular to the central axis X. After the output end of the driving component is inserted into the internal accommodation portion 208, the fastener can be inserted into the fastener receiving portion 212 to abut against the output end of the driving component to prevent the output end of the driving component to move along the central axis X relative to the rotating shaft 112.

Figure 3A:
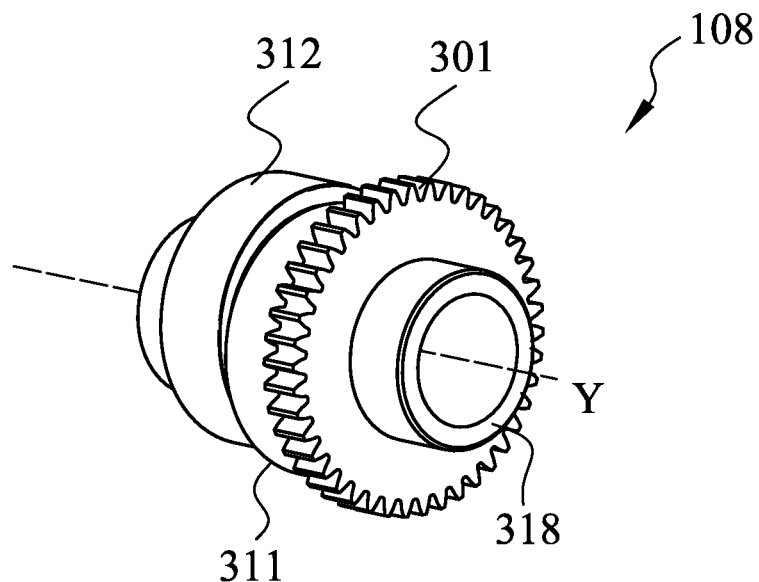
FIG. 3A is a perspective view of an eccentric shaft of the transmission mechanism shown in FIG. 1C as seen from right to left.
Figure 3B:
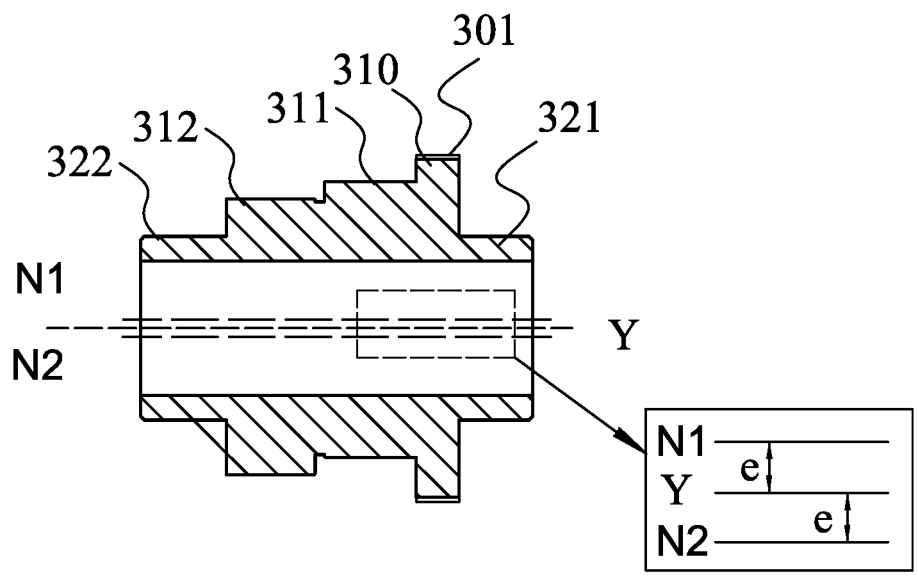
FIG. 3B is an axial cross-sectional view of the eccentric shaft shown in FIG. 3A.

FIG. 3A is a perspective view of the eccentric shaft 108 of the transmission mechanism 100 shown in FIG. 1C as seen from right to left. FIG. 3B is an axial cross-sectional view of the eccentric shaft 108 shown in FIG. 3A to show the specific structure of the eccentric shaft 108. As shown in FIGS. 3A-3B, the eccentric shaft 108 comprises an eccentric shaft body 318, which is substantially cylindrical and has a central axis Y. The eccentric shaft 108 is provided with an eccentric shaft engaging portion 310 that is formed by extending outward along the radial direction of the eccentric shaft body 318. The external circumferential surface of the eccentric shaft engaging portion 310 is provided with eccentric shaft external teeth 301 for engaging with the second row of planetary teeth 431 of the planetary gearing device 151, 152, 153 (see FIG. 4B). The eccentric shaft 108 is further provided with a first eccentric portion 311 and a second eccentric portion 312 which are disposed on the left side of the eccentric shaft engaging portion 310. The first eccentric portion 311 and the second eccentric portion 312 are symmetrically and eccentrically arranged with respect to the central axis Y and have the same eccentricity. Both the first eccentric portion 311 and the second eccentric portion 312 are a circular ring eccentrically disposed with respect to the central axis Y of the eccentric shaft 108. The external circumferential face of the first eccentric portion 311 and the external circumferential face of the second eccentric portion 312 have the same diameter. More specifically, the first eccentric portion 311 and the second eccentric portion 312 respectively have a first inner wheel central axis N1 and a second inner wheel central axis N2. The first inner wheel central axis N1 and the second inner wheel central axis N2 have a distance e from the central axis Y of the eccentric shaft 108. The distance e is greater than 0. The first inner wheel central axis N1 and the second inner wheel central axis N2 are symmetrically arranged with respect to the central axis Y. That is, the first eccentric portion 311 and the second eccentric portion 312 have an axial phase difference of 180°. When the eccentric shaft 108 rotates around the central axis Y thereof, the first inner wheel central axis N1 of the first eccentric portion 311 and the second inner wheel central axis N2 of the second eccentric portion 312 both rotate around the central axis Y.

Figure 11A:
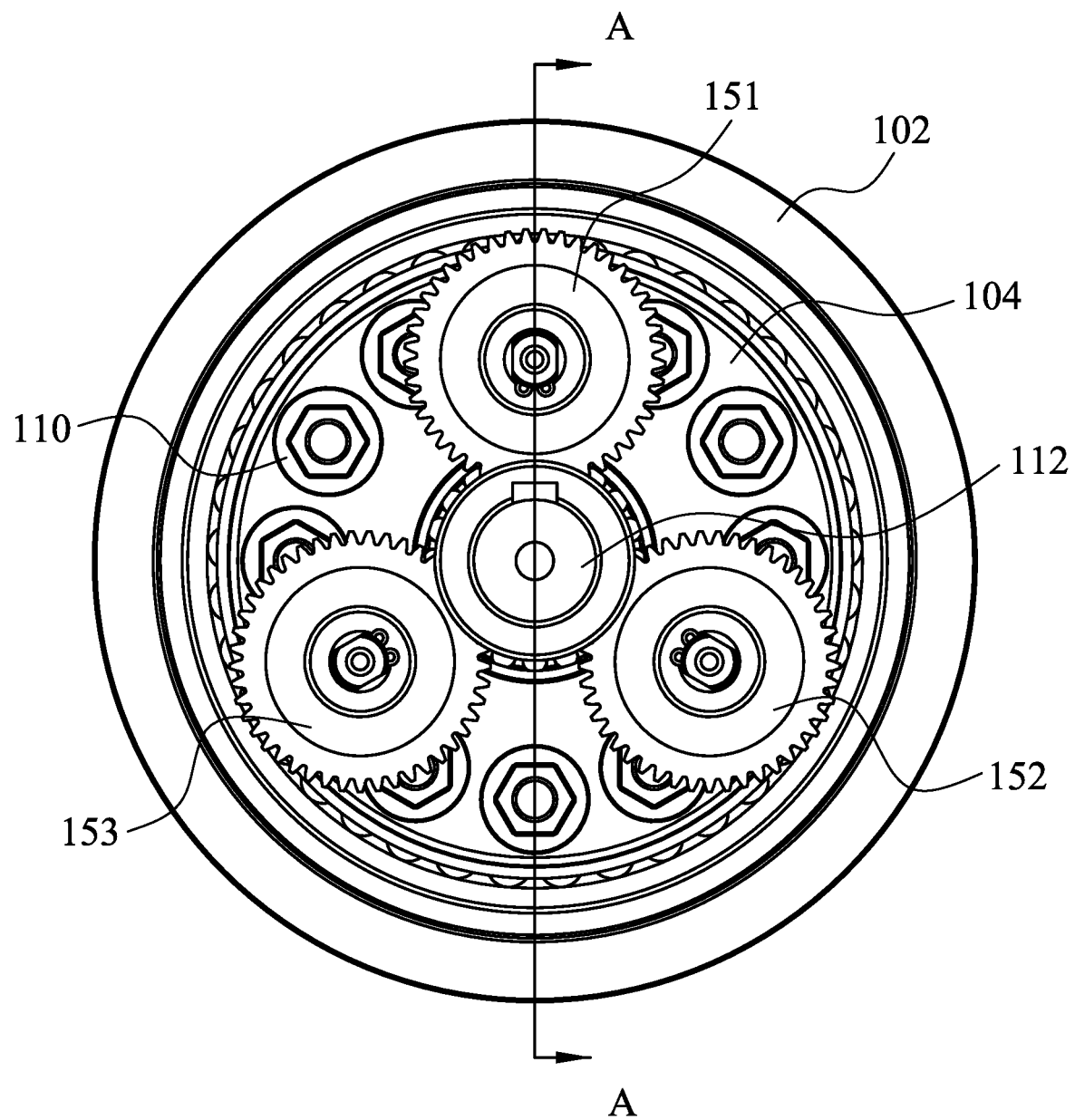
FIG. 11A is a side view of the transmission mechanism shown in FIG. 1C as seen from right to left.
Figure 11B:
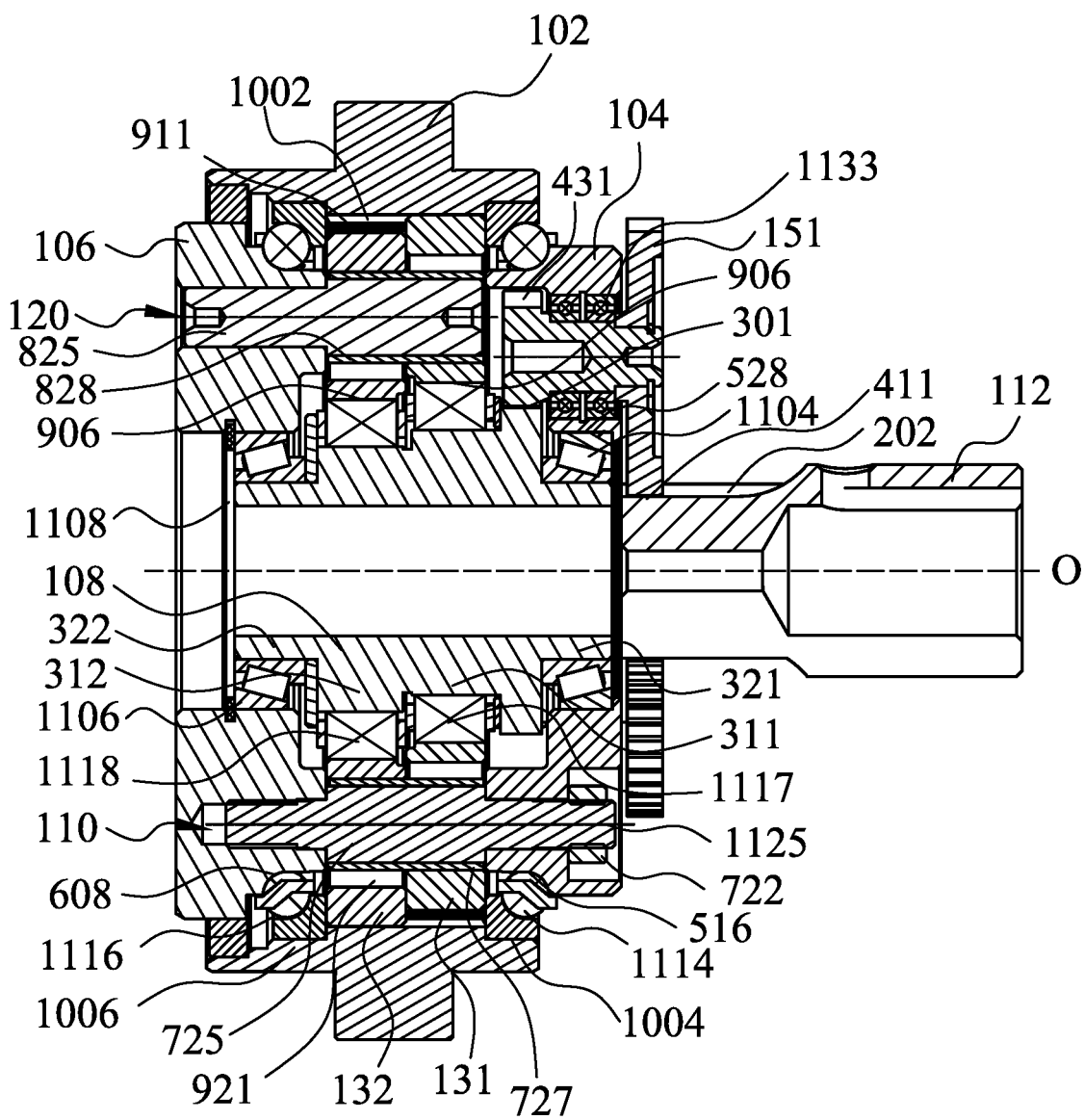
FIG. 11B is a cross-sectional view of the transmission mechanism shown in FIG. 1C along line A-A in FIG. 11A.

The right end of the eccentric shaft body 318 extends beyond the first eccentric portion 311 along the central axis Y to form a first supporting portion 321 for abutting against the inner wall of the first flange bearing 1104 (see FIG. 11B). Since the eccentric shaft engaging portion 310 extends radially beyond the first supporting portion 321, it can restrict the first flange bearing 1104 from axially moving to the left. The left end of the eccentric shaft body 318 extends beyond the second eccentric portion 312 along the central axis Y to form a second supporting portion 322 for abutting against the inner wall of the second flange bearing 1106 (see FIG. 11B). Since the second eccentric portion 312 extends radially beyond the second supporting portion 322, it can restrict the second flange bearing 1106 from axially moving to the right.

Referring to FIGS. 1A-1C, the planetary gearing device 151, the planetary gearing device 152 and the planetary gearing device 153 have the same structure, and are evenly disposed on the first flange 104. For more brief description, the planetary gearing device 151 is taken as an example for structural description below with reference to FIGS. 4A-4B.

Figure 4A:
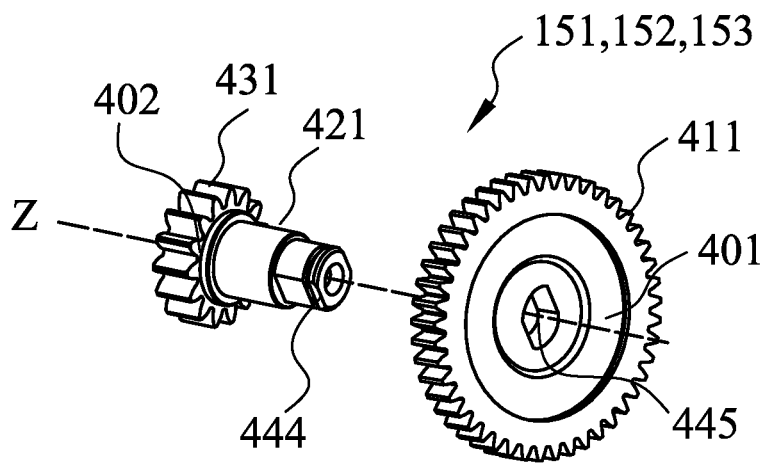
FIG. 4A is an exploded view of a planetary gearing device of the transmission mechanism shown in FIG. 1C as seen from right to left.
Figure 4B:
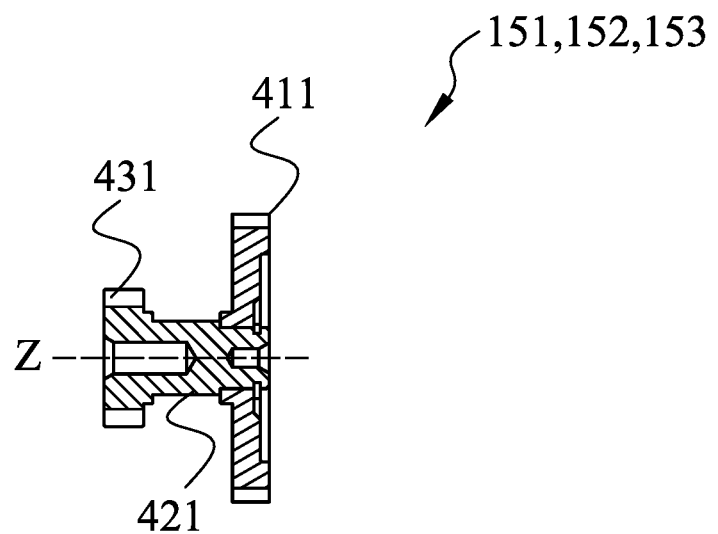
FIG. 4B is an axial cross-sectional view of the planetary gearing device of the transmission mechanism shown in FIG. 1C.

FIG. 4A is an exploded view of the planetary gearing device 151 of the transmission mechanism 100 shown in FIG. 1C as seen from right to left. FIG. 4B is a cross-sectional view of the planetary gearing device 151 of the transmission mechanism shown in FIG. 1C to show the specific structure of the planetary gearing 151. As shown in FIGS. 4A-4B, the planetary gearing device 151 comprises a first planetary gear 401, a planetary gear supporting portion 421, and a second planetary gear 402. The first planetary gear 401, the planetary gear supporting portion 421, and the second planetary gear 402 have a central axis Z. The first planetary gear 401 is provided with a first row of planetary teeth 411 for engaging with the rotating shaft external teeth 202. The second planetary gear 402 is provided with a second planetary gear 431 for engaging with the eccentric shaft external teeth 301. The planetary gear supporting portion 421 is used for arrangement of the planetary gearing bearing 1133 (see FIG. 11B). In the embodiment of the present application, the second planetary gear 402 and the planetary gear supporting portion 421 are integrally formed. The right end of the planetary gear supporting portion 421 has a substantially rectangular connecting portion 444 for connecting with the first planetary gear 401. The first planetary gear 401 is provided with a connecting and receiving portion 445, which penetrates the second planetary gear 402 and is used to accommodate the connecting portion 444 to enable the first planetary gear 401 and the second planetary gear 402 to be connected together, such that the first planetary gear 401 and the second planetary gear 402 rotate together around the central axis Z.

It could be understood by those skilled in the art that, although the first planetary gear 401 is integrally formed with the planetary gear supporting portion 421 and is connected to the second planetary gear 402 in this embodiment, the first planetary gear 401 and the second planetary gear 402 can be connected together in any way, which fall within the scope of protection of the present application.

Figure 5B:
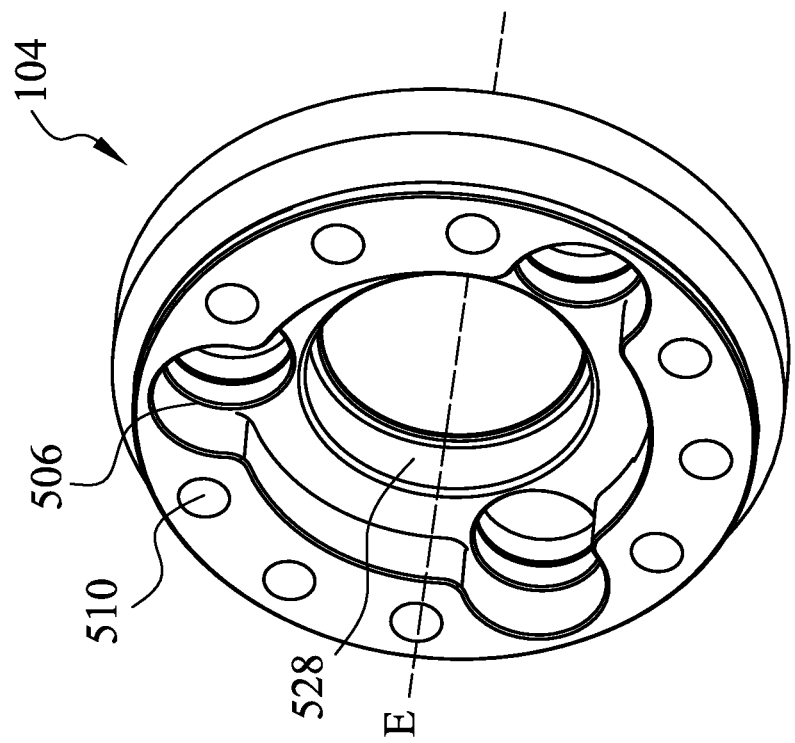
FIG. 5B is a perspective view of the first flange shown in FIG. 5A as seen from left to right.
Figure 5A:
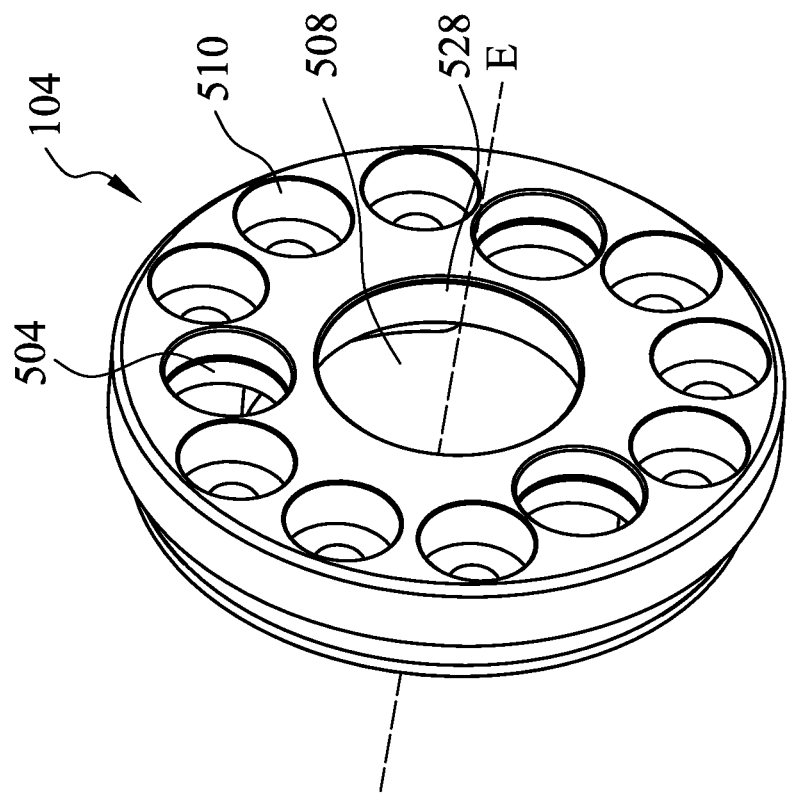
FIG. 5A is a perspective view of a first flange of the transmission mechanism shown in FIG. 1C as seen from right to left.
Figure 5C:
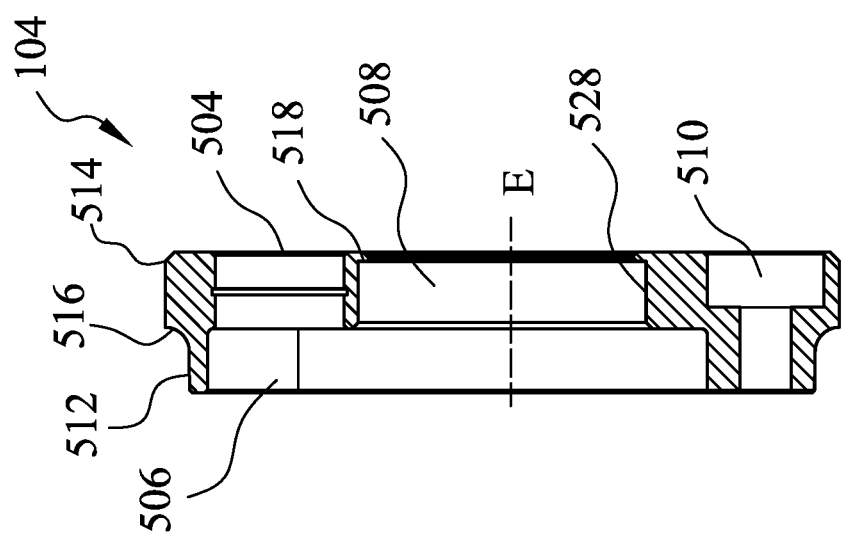
FIG. 5C is an axial cross-sectional view of the first flange shown in FIG. 5A.

FIG. 5A is a perspective view of the first flange 104 of the transmission mechanism 100 shown in FIG. 1C as seen from right to left. FIG. 5B is a perspective view of the first flange 104 shown in FIG. 5A as seen from left to right. FIG. 5C is an axial cross-sectional view of the first flange 104 shown in FIG. 5A. Specifically, the first flange 104 comprises a first flange body 512 and a first flange projecting portion 514. The first flange body 512 is substantially ring-shaped and has a central axis E. The first flange projecting portion 514 is disposed at the right portion of the first flange body 512, and is formed by radially extending from the first flange body 512. The first flange body 512 and the first flange projecting portion 514 form a step portion 516 used to receive balls in the first outer wheel bearing assembly 1114 (see FIG. 11B) and restrict the first outer wheel bearing assembly 1114 from axially moving to the right.

The first flange 104 is provided with an eccentric shaft accommodation portion 508 that transversely penetrates the first flange 104 to accommodate the eccentric shaft 108. Specifically, the size of the left portion of the eccentric shaft accommodation portion 508 is greater than the size of the right portion of the eccentric shaft accommodation portion 508, such that the left portion of the eccentric shaft accommodation portion 508 can accommodate the eccentric shaft external teeth 301 on the eccentric shaft 108, and the right portion of the eccentric shaft accommodation portion 508 can accommodate the first supporting portion 321 of the eccentric shaft 108 and the first flange bearing 1104 that is sheathed over the first supporting portion 321 (see FIG. 11B). More specifically, the right portion of the eccentric shaft accommodation portion 508 has an inner wall 528 for contacting with the outer wall of the first flange bearing 1104.

The first flange 104 is further provided with three supporting holes 504 that transversely penetrate the first flange 104. The three supporting holes 504 are evenly disposed in the circumferential direction of the first flange 104. The first flange 104 is further provided with three planetary gearing accommodation portions 506. Each of the three planetary gearing accommodation portions 506 is disposed around a corresponding one of the three supporting holes 504. The right portion of the planetary gearing accommodation portion 506 can accommodate the planetary gear supporting portion 421 and the planetary gearing bearing 1133 that is sheathed over the planetary gear supporting portion 421, and the planetary gearing accommodation portion 506 is used for accommodating the second planetary gear 402. when the planetary gearing device 151, 152, 153 and the eccentric shaft 108 are disposed in place, the second row of planetary teeth 431 on the second planetary gear 402 can engage with the eccentric shaft external teeth 301 on the eccentric shaft 108.

The first flange 104 is further provided with nine connection and transfer component mounting portions 510 that transversely penetrate the first flange 104. Each group of three connection and transfer component mounting portions 510 are evenly disposed between two planetary gearing accommodation portions 506. The nine connection and transfer component mounting holes 510 are all counterbored holes used to receive the connection and transfer components 110 (see FIG. 11B).

Figure 6A:
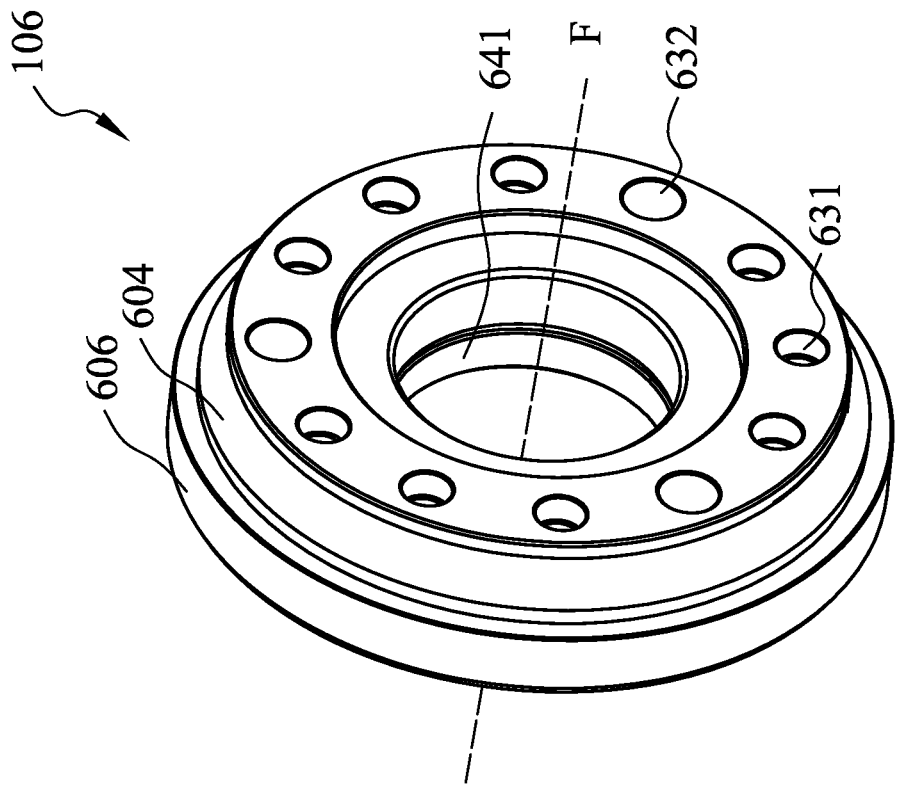
FIG. 6A is a perspective view of a second flange of the transmission mechanism shown in FIG. 1C as seen from right to left.
Figure 6C:
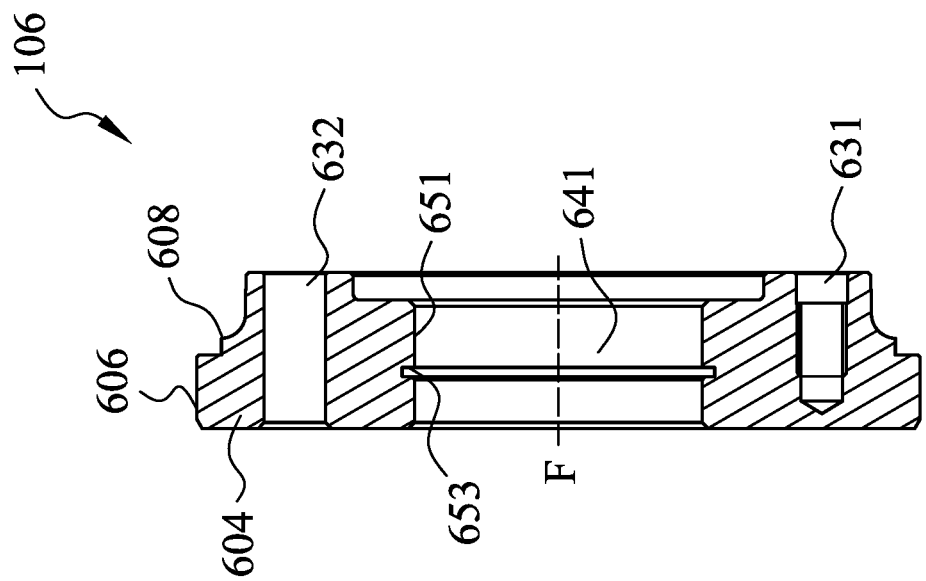
FIG. 6C is an axial cross-sectional view of the second flange shown in FIG. 6A.
Figure 6B:
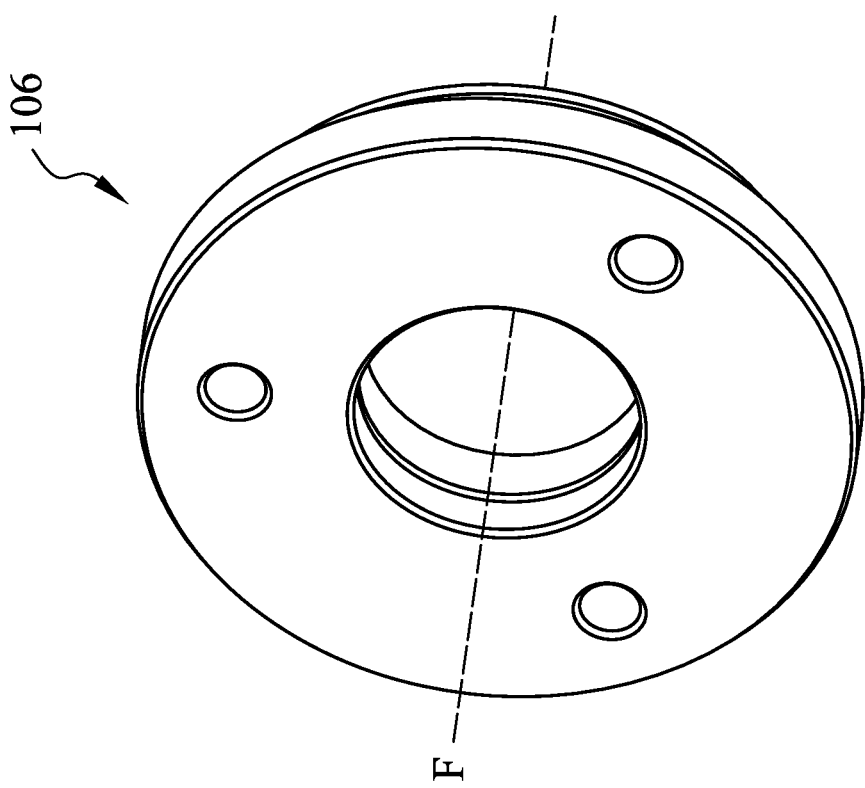
FIG. 6B is a perspective view of the second flange shown in FIG. 6A as seen from left to right.

FIG. 6A is a perspective view of the second flange 106 of the transmission mechanism 100 shown in FIG. 1C as seen from right to left. FIG. 6B is a perspective view of the second flange 106 shown in FIG. 6A as seen from left to right. FIG. 6C is an axial cross-sectional view of the second flange 106 shown in FIG. 6A. Specifically, the second flange 106 comprises a second flange body 604 and a second flange projecting portion 606. The second flange body 604 is substantially ring-shaped and has a central axis F. The second flange projecting portion 606 is disposed at the left portion of the second flange body 604, and is formed by radially extending from the second flange body 604. The second flange body 604 and second flange projecting portion 606 form a step portion 608 used to receive balls in the second outer wheel bearing assembly 1116 (see FIG. 11B) and restrict the second outer wheel bearing assembly 1116 from axially moving to the left.

The second flange 106 is provided with an internal accommodation cavity 641 that transversely penetrates the second flange body 604 to accommodate the second supporting portion 322. The inner wall of the internal accommodation cavity 641 is provided with a radially extending groove 653. The inner wall 651 of the right side of the groove 653 is used for receiving the second flange bearing 1106 (see FIG. 11B), and the groove 653 is used for mounting a stop sheet 1108 (see FIG. 11B) to restrict the second flange bearing 1106 from axially moving to the left.

The second flange 106 is further provided with nine connection and transfer component mounting portions 631 and three auxiliary transfer component mounting portions 632, which are evenly arranged in the circumferential direction of the second flange 106 and are respectively used for receiving nine connection and transfer components 110 and three auxiliary transfer components 120 (see FIG. 1C). Each of the nine connection and transfer component mounting portions 631 is provided with a screw thread to fit with the screw thread on one end of the connection and transfer component 110 such that the second flange 106 can be connected to the connection and transfer component 110. As shown in FIGS. 1A and 11A, the transmission mechanism 100 in this embodiment is provided with nine connection and transfer components 110. Each of the connection and transfer components 110 has the same structure, and is used to connect the first flange 104 and the second flange 106 together and transfer the power from the first inner wheel 131 and the second inner wheel 132 to the first flange 104 and the second flange 106.

Figure 7A:
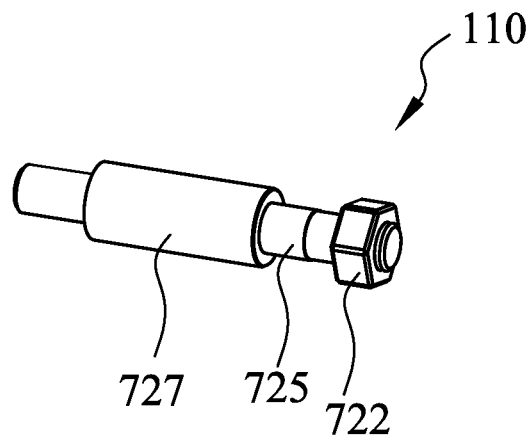
FIG. 7A is a perspective view of a connection and transfer component of the transmission mechanism shown in FIG. 1C.
Figure 7B:
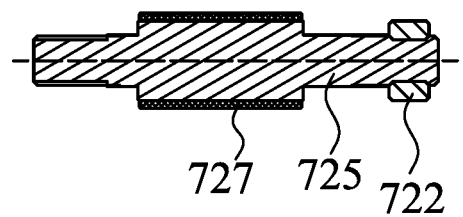
FIG. 7B is an axial cross-sectional view of the connection and transfer component shown in FIG. 7A.

FIG. 7A is a perspective view of the connection and transfer component 110 of the transmission mechanism 100 shown in FIG. 1C. FIG. 7B is an axial cross-sectional view of the connection and transfer component 110 shown in FIG. 7A. As shown in FIGS. 7A-7B, the connection and transfer component 110 comprises a pin 725, a sleeve 727, and a fastener 722. In this embodiment, the fastener 722 is a nut. The pin 725 is substantially cylindrical, with the diameter thereof being larger at the middle portion and smaller at two ends. The sleeve 727 is sheathed over the middle portion of the pin 725 with the larger diameter. The middle portion of the pin 725 and the sleeve 727 are accommodated in the inner wheel through-holes 921 of the first inner wheel 131 and the second inner wheel 132 (see FIG. 9) to transfer the power from the first inner wheel 131 and the second inner wheel 132 to the first flange 104 and the second flange 106. The sleeve 727 is used for protecting the pin 725 from wear. The two ends of the pin 725 with the smaller diameter are provided with screw threads. The screw thread at the left end of the pin 725 can fit with the screw thread in the connection and transfer component mounting portion 631 such that the pin 725 is connected to the second flange 106. The screw thread at the right end of the pin 725 can fit with the screw thread in the fastener 722 to enable the pin 725 to be connected to the first flange 104.

As shown in FIGS. 1A and 11A, three auxiliary transfer components 120 are provided in the transmission mechanism 100 according to this embodiment. Each of the auxiliary transfer components 120 has the same structure, and is used for transferring the power from the first inner wheel 131 and the second inner wheel 132 to the second flange 106. Since the first flange 104 and the second flange 106 are connected together, the auxiliary transfer component 120 can transfer the power from the first inner wheel 131 and second inner wheel 132 to the first flange 104 and the second flange 106.

Figure 8A:
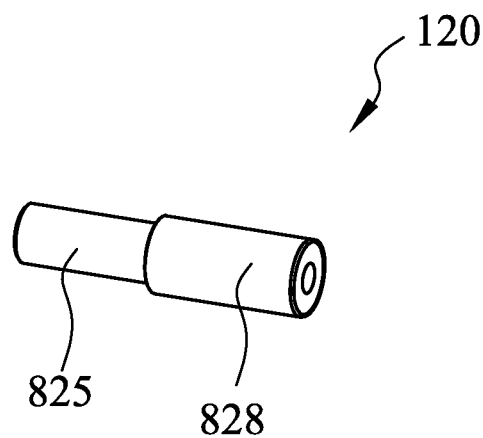
FIG. 8A is a perspective view of an auxiliary transfer component of the transmission mechanism shown in FIG. 1C.
Figure 8B:
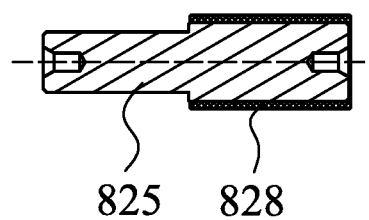
FIG. 8B is an axial cross-sectional view of the auxiliary transfer component shown in FIG. 8A.

FIG. 8A is a perspective view of the auxiliary transfer component 120 of the transmission mechanism 100 shown in FIG. 1C. FIG. 8B is an axial cross-sectional view of the auxiliary transfer component 120 shown in FIG. 8A. As shown in FIGS. 8A-8B, the auxiliary transfer component 120 comprises a pin 825 and a sleeve 828. The pin 825 is substantially cylindrical, with the diameter thereof being larger at the right portion and smaller at the left portion. The left portion of the pin 825 is accommodated in the auxiliary transfer component mounting portion 632 on the second flange 106 so as to fit with the second flange 106. The sleeve 828 is sheathed over the right portion of the pin 825 with the larger diameter. The right portion of the pin 825 and the sleeve 828 are accommodated in the inner wheel through-holes 921 of the first inner wheel 131 and the second inner wheel 132 (see FIG. 9) to transfer the power from the first inner wheel 131 and the second inner wheel 132 to the second flange 106. The sleeve 828 is used to protect the pin 825 from wear.

As shown in FIGS. 1C and 11B, a first inner wheel 131 and a second inner wheel 132 are provided in the transmission mechanism 100 according to this embodiment. In this embodiment, the first inner wheel 131 and the second inner wheel 132 have the same structure, and are used for transferring the power from the eccentric shaft 108 to the connection and transfer component 110 and the auxiliary transfer component 120.

Figure 9:
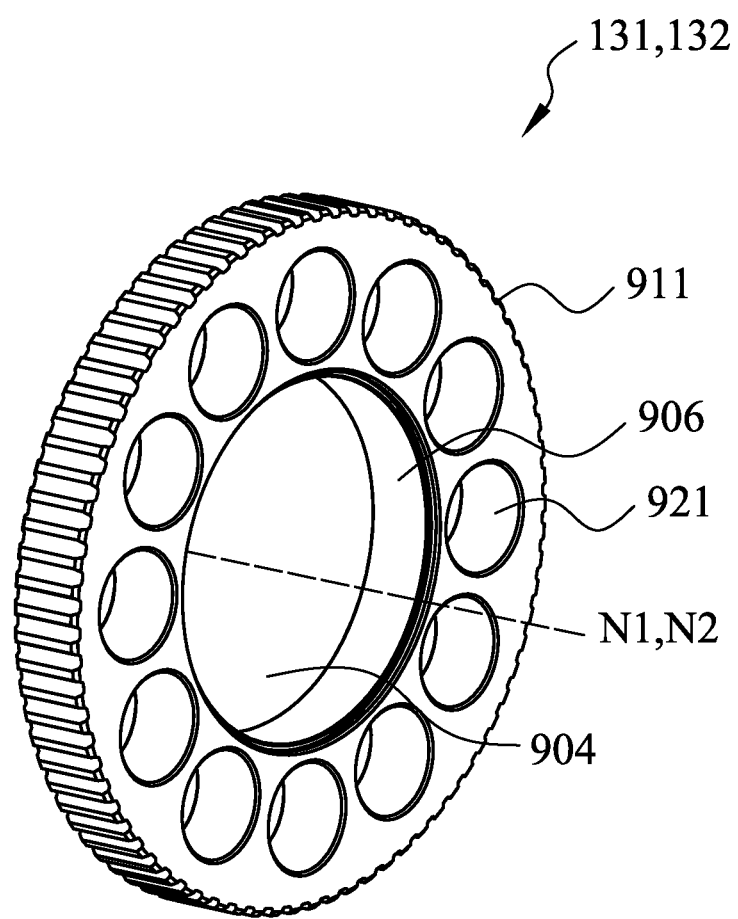
FIG. 9 is a perspective view of a first inner wheel and a second inner wheel of the transmission mechanism shown in FIG. 1C.

FIG. 9 is a perspective view of the first inner wheel 131 and the second inner wheel 132 of the transmission mechanism 100 shown in FIG. 1C. As shown in FIG. 9, the first inner wheel 131 and the second inner wheel 132 are substantially ring-shaped and have a certain thickness. The first inner wheel 131 and the second inner wheel 132 respectively have central axes N1 and N2. The first inner wheel 131 and the second inner wheel 132 are further provided therein with an accommodation portion 904 that radially penetrates the first inner wheel 131 and the second inner wheel 132. The diameter of the wall 906 of the accommodation portion 904 is substantially the same as the outer diameters of inner wheel bearings 1117, 1118 (see FIG. 11B), such that the first inner wheel 131 and the second inner wheel 132 can be sheathed over the inner wheel bearings 1117, 1118 arranged around the eccentric portions 311, 312. When the eccentric shaft 108 rotates, the eccentric portions 311, 312 of the eccentric shaft 108 can drive the eccentric rotation of the first inner wheel 131 and the second inner wheel 132 via the inner wheel bearings 1117, 1118. In other words, when the eccentric shaft 108 rotates, the eccentric shaft 108 enables the central axes N1, N2 of the first inner wheel 131 and the second inner wheel 132 to rotate around the central axis Y of the eccentric shaft 108 (i.e., the first inner wheel 131 and the second inner wheel 132 can rotate along a circular path around the central axis Y of the eccentric shaft 108). The periphery of the first inner wheel 131 and the second inner wheel 132 is provided with inner wheel external teeth 911. The inner wheel external teeth 911 is configured to engage with the outer wheel internal teeth 1002 of the outer wheel 102 (see FIGS. 10A and 10B). More specifically, when the first inner wheel 131 and the second inner wheel 132 move, at least some of the inner wheel external teeth 911 can engage with the outer wheel internal teeth 1002 of the outer wheel 102. There is a difference in the number of teeth between the inner wheel external teeth 911 and the outer wheel internal teeth 1002. The number of the outer wheel internal teeth 1002 is greater than the number of the inner wheel external teeth 911 (i.e., the difference in the number of teeth is an integer greater than zero). When the first inner wheel 131 and the second inner wheel 132 are driven by the eccentric shaft 108 to eccentrically rotates in the outer wheel 102, the engagement of the inner wheel external teeth 911 and the outer wheel internal teeth 1002 enables the first inner wheel 131 and the second inner wheel 132 to rotate (i.e., rotating on their own axes). In this way, the eccentric shaft 108 enables the first inner wheel 131 and the second inner wheel 132 to rotate in the outer wheel 102 along a circular path and rotate on their own axes.

The first inner wheel 131 and the second inner wheel 132 further comprise twelve inner wheel through-holes 921, which are evenly arranged around the central axes N1, N2 in the circumferential direction and are used to accommodate the connection and transfer components 110 and the auxiliary transfer components 120. Since the outer diameter of the sleeve 727 of the connection and transfer component 110 is the same size as the outer diameter of the sleeve 828 of the auxiliary transfer component 120, the twelve inner wheel through-holes 921 have the same size. A gap is provided between the wall of the inner wheel through-hole 921 and the periphery of the sleeve 727 and of the sleeve 828, and is configured such that when the first inner wheel 131 and the second inner wheel 132 eccentrically rotate, the first flange 104 and the second flange 106 can be driven to rotate together via the connection and transfer component 110 and the auxiliary transfer component 120.

Figure 10A:
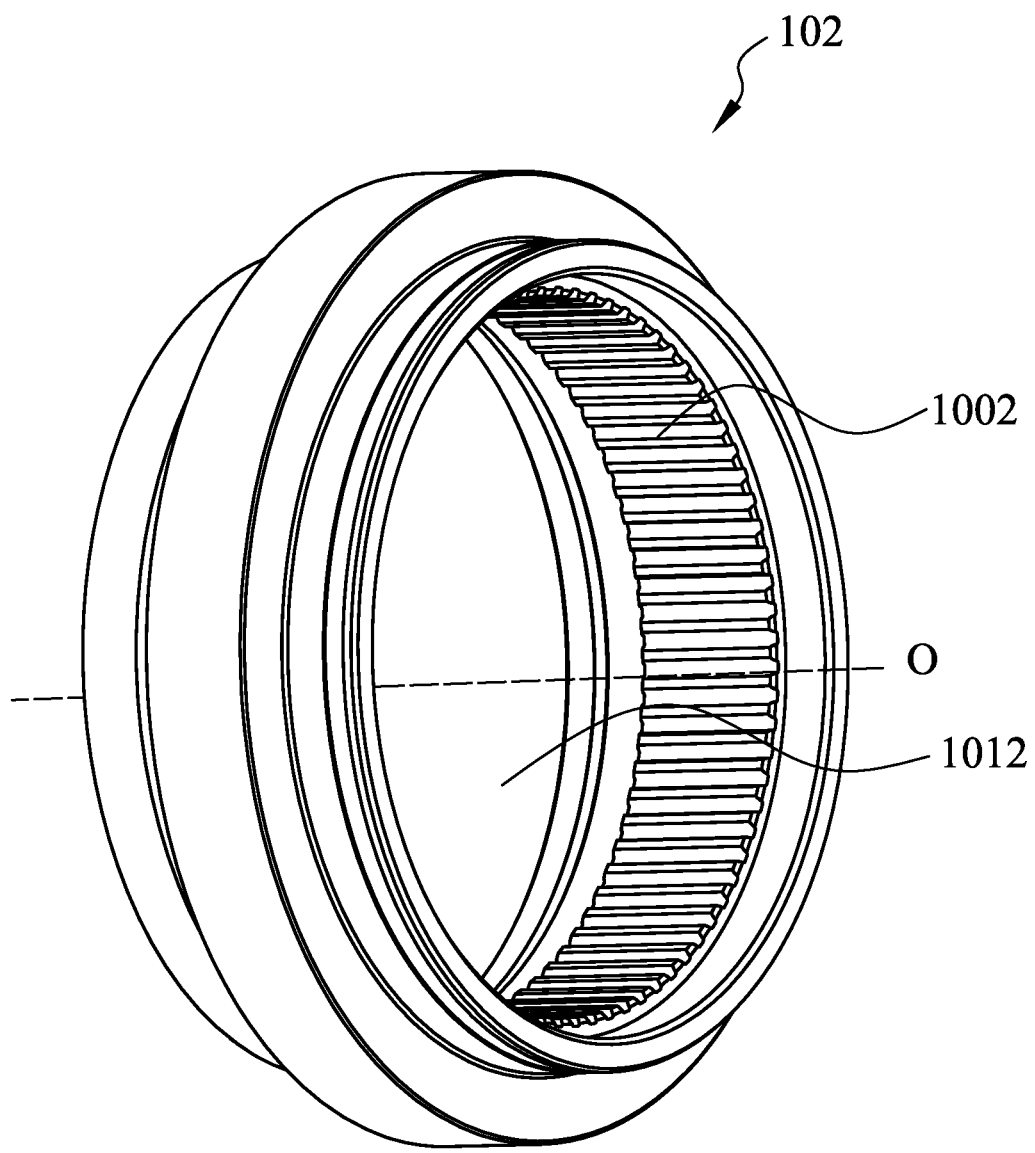
FIG. 10A is a perspective view of an outer wheel of the transmission mechanism shown in FIG. 1C.
Figure 10B:
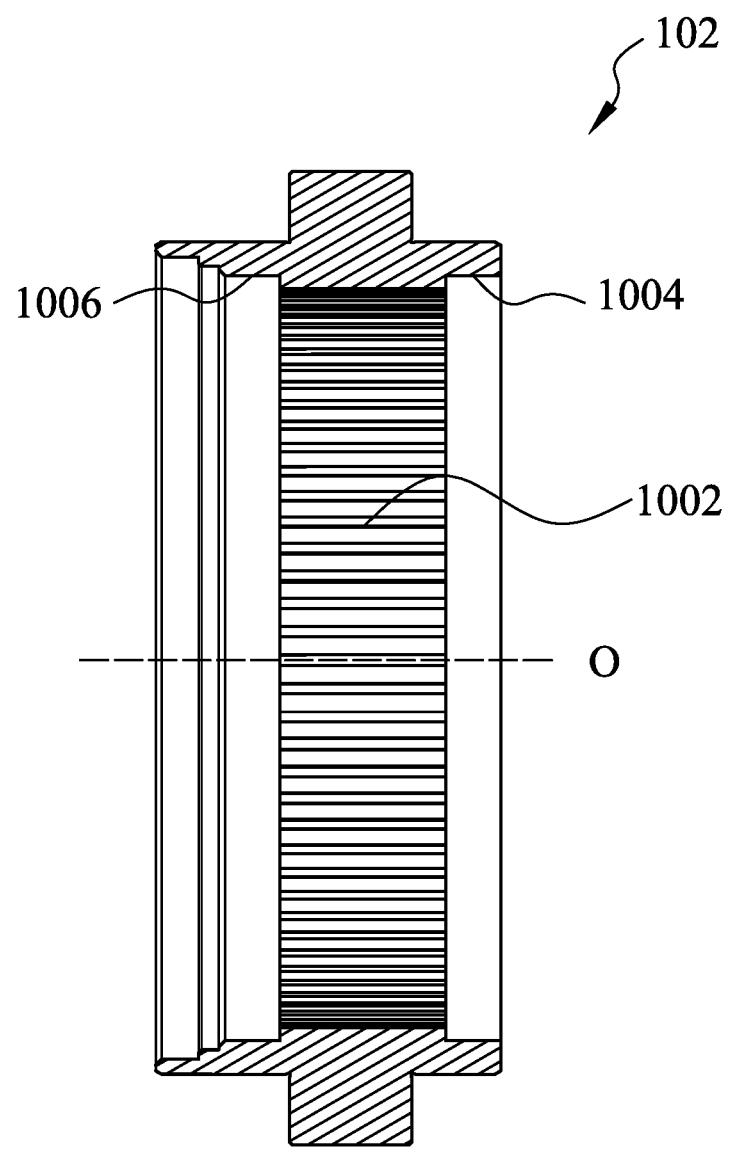
FIG. 10B is an axial cross-sectional view of the outer wheel shown in FIG. 10A.

FIG. 10A is a perspective view of the outer wheel 102 of the transmission mechanism 100 shown in FIG. 1C. FIG. 10B is an axial cross-sectional view of the outer wheel 102 shown in FIG. 10A. As shown in FIGS. 10A and 10B, the outer wheel 102 is substantially ring-shaped and has an outer wheel central axis O. The outer wheel 102 has an accommodation portion 1012, and the accommodation portion 1012 penetrates the outer wheel 102. The middle portion of the wall of the accommodation portion 1012 is provided with outer wheel internal teeth 1002 that can engage with the inner wheel external teeth 911 of the first inner wheel 131 and the second inner wheel 132.

The outer wheel 102 is further provided with a first supporting portion 1004 and a second supporting portion 1006, which are respectively disposed on the left and right sides of the outer wheel internal teeth 1002. The first supporting portion 1004 is used to support the first outer wheel bearing assembly 1114, and the second supporting portion 1006 is used to support the second outer wheel bearing assembly 1116 (see FIG. 11B).

FIG. 11A is a side view of the transmission mechanism 100 shown in FIG. 1C as seen from right to left. FIG. 11B is a cross-sectional view of the transmission mechanism shown in FIG. 1C along line A-A in FIG. 11A to show the relationship of relative position and the fitting relationship of the components in the transmission mechanism 100. The rotating shaft 112, the eccentric shaft 108, the first flange 104 and the second flange 106 are disposed coaxially with the outer wheel 102. The first eccentric portion 311 of the eccentric shaft 108 is provided with a first inner wheel bearing 1117. The second eccentric portion 312 of the eccentric shaft 108 is provided with a second inner wheel bearing 1118. Specifically, the inner wall of the first inner wheel bearing 1117 is in contact with the external circumferential face of the first eccentric portion 311, and the outer wall of the first inner wheel bearing 1117 is in contact with the wall 906 of the accommodation portion 904 of the first inner wheel 131, such that the first inner wheel 131 is sheathed over the first eccentric portion 311. When the eccentric shaft 108 rotates around the central axis O, the first inner wheel 131 can rotate along a circular path around the central axis O, that is, the first inner wheel central axis N1 of the first inner wheel 131 rotates (i.e., translates) around the central axis O. The inner wall of the second inner wheel bearing 1118 is in contact with the external circumferential face of the second eccentric portion 312, and the outer wall of the second inner wheel bearing 1118 is in contact with the wall 906 of the accommodation portion 904 of the second inner wheel 132, such that the second inner wheel 132 is sheathed over the second eccentric portion 312. When the eccentric shaft 108 rotates around the central axis O, the second inner wheel 132 rotates along a circular path around the central axis O, that is, the second inner wheel central axis N2 of the second inner wheel 132 rotates (i.e., translates) around the central axis O.

Since the first inner wheel 131 and the second inner wheel 132 have the same structure, and the first inner wheel 131 and the second inner wheel 132 are symmetrically and eccentrically arranged relative to the central axis O, when the eccentric shaft 108 drives the first inner wheel 131 and the second inner wheel 132 to rotate, the first inner wheel 131 and the second inner wheel 132 always have a phase difference of 180°, thereby ensuring the first inner wheel 131 and the second inner wheel 132 to maintain a dynamic balance as a whole during movement.

Furthermore, the first inner wheel 131 and the second inner wheel 132 both engage with the outer wheel 102. Specifically, when the eccentric shaft 108 drives the first inner wheel 131 and the second inner wheel 132 to rotate along a circular path, since there is a difference in the number of teeth between the inner wheel external teeth 911 and the outer wheel internal teeth 1002, and the outer wheel 102 is fixed, the first inner wheel 131 and the second inner wheel 132 can rotate around their respective central axes (i.e., the first inner wheel central axis N1 and the second inner wheel central axis N2). That is, the first inner wheel 131 and the second inner wheel 132 rotate on their own axes while rotating along a circular path (i.e., eccentric rotation).

The first flange 104 and the second flange 106 are respectively disposed on two sides of the first inner wheel 131 and the second inner wheel 132, and the first flange 104 and the second flange 106 are connected together via the connection and transfer component 110. The first inner wheel 131 and the second inner wheel 132 drive the first flange 104 and the second flange 106 to rotate via the connection and transfer component 110. The first flange 104 is disposed on the right side of the inner wheel 131, and the second flange 106 is disposed on the left side of the inner wheel 132.

Specifically, the first flange 104 is sheathed over the eccentric shaft 108 via the first flange bearing 1104, and is disposed in the outer wheel 102 via the first outer wheel bearing assembly 1114. The inner wall of the first flange bearing 1104 is in contact with the first supporting portion 321, and the outer wall of the first flange bearing 1104 is in contact with the inner wall 528 of the eccentric shaft accommodation portion 508 of the first flange 104. The balls in the first outer wheel bearing assembly 1114 abut against the step portion 516 of the first flange 104, and the outer wall of the first outer wheel bearing assembly 1114 is contact with the first supporting portion 1004 of the outer wheel 102.

Similarly, the second flange 106 is sheathed over the eccentric shaft 108 via the second flange bearing 1106, and is disposed in the outer wheel 102 via the second outer wheel bearing assembly 1116. The inner wall of the second flange bearing 1106 is in contact with the second supporting portion 322, and the outer wall of the second flange bearing 1106 is in contact with the inner wall 651 of the second flange body 604. The balls in the second outer wheel bearing assembly 1116 abut against the step portion 608 of the second flange 106, and the outer wall of the second outer wheel bearing assembly 1116 is in contact with the second supporting portion 1006 of the outer wheel 102, such that the second flange 106 is mounted on the outer wheel 102 via the second outer wheel bearing assembly 1116.

Thus, both the first flange 104 and the second flange 106 can rotate around the central axis O relative to the outer wheel 102.

The first flange 104 and the second flange 106 are connected to each other via the pin 725 and the fastener 722 in the connection and transfer component 110, and the first inner wheel 131 and the second inner wheel 132 drive, via the connection and transfer component 110, the first flange 104 and the second flange 106 to rotate around the central axis O. Specifically, the screw thread at the left end of the pin 725 is fit with the screw thread in the connection and transfer component mounting portion 631 on the second flange 106, such that the pin 725 is connected to the second flange 106. The right end of the pin 725 passes through the connection and transfer component mounting hole 510 in the first flange 104 from the left side of the first flange 104, and then the fastener 722 is sheathed over the right end of the pin 725 from the right side of the first flange 104. The screw thread on the fastener 722 fits with the screw thread at the right end of the pin 725, such that the first flange 104 and the second flange 106 are connected together.

Each of the planetary gearing device 151, 152, 153 is supported on the first flange 104. Specifically, a planetary gearing bearing 1133 is sheathed over the planetary gear supporting portion 421 of each of the planetary gearing device 151, 152, 153, and passes through the supporting hole 504 in the first flange 104 from the left side and then extends out of the right side of the first flange 104. The left end of the planetary gear supporting portion 421 is connected to the second planetary gear 402, and the right end of the planetary gear supporting portion 421 is connected to the first planetary gear 401, such that the three planetary gearing device 151, 152, 153 are rotatably supported on the first flange 104. The second row of planetary teeth 431 on the second planetary gears 402 of the three planetary gearing device 151, 152, 153 engage with the eccentric shaft external teeth 301 of the eccentric shaft 108, such that the three planetary gearing device 151, 152, 153 can drive the eccentric shaft 108 to rotate.

The rotating shaft 112 is disposed on the right side of the first flange 104, and is disposed among the three planetary gearing device 151, 152, 153. The right end of the rotating shaft 112 is configured to be connected to the driving component (not shown) to enable the rotating shaft 112 to rotate. The rotating shaft external teeth 202 at the left end of the rotating shaft 112 engage with the first row of planetary teeth 411 of the planetary gearing device 151, 152, 153, such that the rotating shaft 112 can drive the three planetary gearing device 151, 152, 153 to rotate.

Furthermore, the first inner wheel 131 and the second inner wheel 132 can also drive, via the auxiliary transfer component 120, the second flange 106 to rotate around the central axis O. Specifically, the left portion of the pin 825 of the auxiliary transfer component 120 is accommodated in the auxiliary transfer component mounting portion 632 on the second flange 106, and the right portion of the pin 825 and the sleeve 828 are accommodated in the inner wheel through-holes 921 of the first inner wheel 131 and the second inner wheel 132, such that when the first inner wheel 131 and the second inner wheel 132 rotate, the second flange 106 can be driven to rotate via the auxiliary transfer component 120.

The process of transfer of torque/power during operation of the transmission mechanism 100 will be described below in detail, taking an example in which the outer wheel 102 is fixed (i.e., the outer wheel 102 does not translate or rotate), the first flange 104 and/or the second flange 106 serves as an output component, and the rotating shaft 112 serves as an input component.

A driving component (e.g., a motor, not shown) drives the rotating shaft 112 to rotate around the central axis O. The rotating shaft external teeth 202 of the rotating shaft 112 engage with the first row of planetary teeth 411 of the three planetary gearing device 151, 152, 153, such that the three planetary gearing device 151, 152, 153 can rotate around the respective central axes (i.e., rotate on their own axes). Since the second row of planetary teeth 431 of the three planetary gearing device 151, 152, 153 engage with the eccentric shaft external teeth 301 of the eccentric shaft 108, the rotation of the three planetary gearing device 151, 152, 153 will drive the eccentric shaft 108 to rotate around the central axis O. The eccentric shaft 108 drives, via the first eccentric portion 311 and the second eccentric portion 312, the first inner wheel 131 and the second inner wheel 132 to rotate along a circular path (i.e., the first inner wheel central axis N1 and the second inner wheel central axis N2 rotate around the central axis O). The inner wheel external teeth 911 of the first inner wheel 131 and the second inner wheel 132 engage with the outer wheel internal teeth 1002 of the outer wheel 102, such that the first inner wheel 131 and the second inner wheel 132 rotate on their own axes (i.e., the first inner wheel 131 and the second inner wheel 132 can rotate around their respective central axes N1, N2). In this way, the first inner wheel 131 and the second inner wheel 132 can rotate on their own axes while rotating along a circular path.

When the first inner wheel 131 and the second inner wheel 132 rotate along a circular path and rotate on their own axes, by means of the connection and transfer component 110 (including the pin 725 and the sleeve 727) and the auxiliary transfer component 120 fitting with the inner wheel through-holes 921 of the first inner wheel 131 and the second inner wheel 132, the connection and transfer component 110 and the auxiliary transfer component 120 transfers the rotating of the first inner wheel 131 and the second inner wheel 132 on their own axes to the first flange 104 and the second flange 106, such that the first flange 104 and the second flange 106 rotate around the central axis O. The first flange 104 and/or the second flange 106 may be connected to a driven device (not shown). Thus, the torque of the driving mechanism can be output to the driven device via the transmission mechanism 100.

It should be noted that when the outer wheel 102 is fixed (i.e., the outer wheel 102 does not translate and rotate), when the first flange 104 and/or the second flange 106 serves as an output component while the rotating shaft 112 serves as an input component, since the three planetary gearing device 151, 152, 153 are rotatably supported on the first flange 104 via the supporting holes 504, the rotation of the first flange 104 also drives the three planetary gearing device 151, 152, 153 to rotate along a circular path (i.e., the three planetary gearing device 151, 152, 153 can rotate around the central axis O). However, the rotation of the three planetary gearing device 151, 152, 153 along a circular path will not prevent the second row of planetary teeth 431 of the three planetary gearing device 151, 152, 153 from driving the eccentric shaft 108 to rotate.

It should be noted that, since the first flange 104 and the second flange 106 are mounted on the outer wheel 102 via the first outer wheel bearing assembly 1114 and the second outer wheel bearing assembly 1116, the first flange 104 and the second flange 106 can only rotate around the central axis O. Thus, when power is transferred from the first inner wheel 131 and the second inner wheel 132 to the first flange 104 and the second flange 106, only the rotation of the first inner wheel 131 and the second inner wheel 132 on their own axes is transferred to the first flange 104 and the second flange 106, and the rotation of the first inner wheel 131 and the second inner wheel 132 along a circular path cannot be transferred to the first flange 104 and the second flange 106.

In this embodiment, when the first row of planetary teeth 411 and the rotating shaft external teeth 202 have a first difference in the number of teeth, the second row of planetary teeth 431 and the eccentric shaft external teeth 301 have a second difference in the number of teeth, and the inner wheel external teeth 911 and the outer wheel internal teeth 1002 have a third difference in the number of teeth, the transmission mechanism 100 can achieve three-stage speed change. Specifically, the three-stage speed change includes a first-stage speed change, a second-stage speed change, and a third-stage speed change. The first-stage speed change is achieved by the rotating shaft external teeth 202 of the rotating shaft 112 and the first row of planetary teeth 411 of the planetary gearing device 151, 152, 153, with a speed ratio of $i_1$. The second-stage speed change is achieved by the second row of planetary teeth 431 of the planetary gearing device 151, 152, 153 and the eccentric shaft external teeth 301 of the eccentric shaft 108, with a speed ratio of $i_2$. The third-stage speed change is achieved by transfer from the first inner wheel 131 and the second inner wheel 132 to the first flange 104 and the second flange 106, with a speed ratio of $i_3$. Specifically, the number of teeth of the rotating shaft external teeth 202 of the rotating shaft 112 is $Z_a$, the number of teeth of the first row of planetary teeth 411 of the planetary gearing device 151, 152, 153 is $Z_{b1}$, the number of teeth of the second row of planetary teeth 431 of the planetary gearing device 151, 152, 153 is $Z_{b2}$, the number of teeth of the eccentric shaft external teeth 301 of the eccentric shaft 108 is $Z_c$, the number of teeth of the inner wheel external teeth 911 of the first inner wheel 131 and the second inner wheel 132 is $Z_d$, and the number of teeth of the outer wheel internal teeth 1002 of the outer wheel 102 is $Z_e$. The first-stage speed ratio $i_1$ satisfied:

$$i_1 = -\frac{Z_{b1}}{Z_a}$$

The second-stage speed ratio $i_2$ satisfies:

$$i_2 = -\frac{Z_c}{Z_{b2}}$$

The third-stage speed ratio $i_3$ satisfies:

$$i_3 = \frac{Z_d}{Z_d - Z_e} + \frac{Z_a \times Z_{b2}}{Z_c \times Z_{b1}} - 1$$

Thus, the total speed ratio I satisfies:

$$I = -\frac{Z_{b1}}{Z_a} \times \left(-\frac{Z_c}{Z_{b2}}\right) \times \left(\frac{Z_d}{Z_d - Z_e} + \frac{Z_a \times Z_{b2}}{Z_c \times Z_{b1}} - 1\right) =$$
$$\frac{Z_{b1}}{Z_a} \times \frac{Z_c}{Z_{b2}} \times \left(\frac{Z_d}{Z_d - Z_e} + \frac{Z_a \times Z_{b2}}{Z_c \times Z_{b1}} - 1\right)$$

As described in the present application, the transmission mechanism 100 of the present application has four transmission modes as follows: (1) when the transmission mechanism 100 needs to achieve speed reduction, the outer wheel 102 is fixed, the rotating shaft 112 serves as a power input component, and the first flange 104 and/or the second flange 106 serves as a power output component; (2) when the transmission mechanism 100 needs to achieve speed reduction, the first flange 104 and the second flange 106 are fixed, the rotating shaft 112 serves as a power input component, and the outer wheel 102 serves as a power output component; (3) when the transmission mechanism 100 needs to achieve speed increase, the outer wheel 102 is fixed, the first flange 104 and/or the second flange 106 serve as a power input component, and the rotating shaft 112 serves as a power output component; and (4) when the transmission mechanism 100 needs to achieve speed increase, the first flange 104 and the second flange 106 are fixed, the outer wheel 102 serves as a power input component, and the rotating shaft 112 serves as a power output component. The stages of speed ratio and the total speed ratio in the first transmission mode are expressed above. Similarly, the stages of speed ratio and the total speed ratio in the other three transmission modes may also be calculated.

Specifically, in the above second transmission mode (i.e., when the transmission mechanism 100 needs to achieve speed reduction, the first flange 104 and the second flange 106 are fixed, the rotating shaft 112 serves as a power input component, and the outer wheel 102 serves as a power output component), the first-stage speed ratio $k_1$ and the second-stage speed ratio $k_2$ are the same as the first-stage speed ratio hand the second-stage speed ratio $i_2$ in the first transmission mode. However, in the second transmission mode, since the first flange 104 and the second flange 106 are fixed, the planetary gearing device 151, 152, 153 in the second transmission mode will not rotate along a circular path, and therefore the third-stage speed ratio $k_3$ in the second transmission mode satisfies:

$$k_3 = \frac{Z_e}{Z_e - Z_d}$$

Thus, the total speed ratio K of the transmission mechanism 100 satisfies:

$$K = k_1 \times k_2 \times k_3 = -\frac{Z_{b1}}{Z_a} \times \left(-\frac{Z_c}{Z_{b2}}\right) \times \left(\frac{Z_e}{Z_e - Z_d}\right) = \frac{Z_{b1}}{Z_a} \times \frac{Z_c}{Z_{b2}} \times \frac{Z_e}{Z_e - Z_d}$$

In the above third transmission mode (i.e., when the transmission mechanism 100 needs to achieve speed increase, the outer wheel 102 is fixed, the first flange 104 and/or the second flange 106 serve as a power input component, and the rotating shaft 112 serves as a power output component), based on the order of transmission in the first transmission mode, it would have been readily appreciated by those skilled in the art that the order of transmission in the third transmission mode is in the reverse order of transmission in the first mode, so the order of transmission will not be described in detail. The three-stage transmission may also be achieved, and the total transmission ratio m satisfies:

$$m = \frac{1}{I} = \frac{1}{\frac{Z_{b1}}{Z_a} \times \frac{Z_c}{Z_{b2}} \times \left(\frac{Z_d}{Z_d - Z_e} + \frac{Z_a \times Z_{b2}}{Z_c \times Z_{b1}} - 1\right)}$$

Similarly, in the above fourth transmission mode (i.e., when the transmission mechanism 100 needs to achieve speed increase, the first flange 104 and the second flange 106 are fixed, the outer wheel 102 serves as a power input component, and the rotating shaft 112 serves as a power output component), based on the order of transmission in the second transmission mode, it would have been readily appreciated by those skilled in the art that the order of transmission in the fourth transmission mode is in the reverse order of transmission in the second mode, so the order of transmission will not be described in detail. The three-stage transmission may also be achieved, and the total transmission ratio n satisfies:

$$n = \frac{1}{K} = \frac{1}{\frac{Z_{b1}}{Z_a} \times \frac{Z_c}{Z_{b2}} \times \frac{Z_e}{Z_e - Z_d}}$$

It should be noted that, when the total speed ratio is calculated as a positive number, it is indicated that the direction of rotation of the output component is the same as the direction of rotation of the input component. When the total speed ratio is calculated as a negative number, it is indicated that the direction of rotation of the output component is in opposite direction of rotation of the input component.

In a conventional transmission mechanism, one end of the rotating shaft needs to be disposed in the eccentric shaft. Rotating shaft external teeth are provided on the rotating shaft, and eccentric shaft internal teeth are provided in the eccentric shaft, such that the rotating shaft can engage with the eccentric shaft so as to drive the eccentric shaft to rotate. In such an arrangement, it is necessary to provide an accommodation cavity in the eccentric shaft for accommodating the rotating shaft and to provide eccentric shaft internal teeth, which requires a larger space, resulting in a larger overall size of the transmission mechanism. Furthermore, since it is more difficult for the machine to machining the internal teeth than the external teeth, the machining efficiency is low. For example, for a component with a diameter of 40 mm, if the external teeth are machined, it only needs to take 3-15 minutes, but if the internal teeth are machined, it needs to take at least 1 hour.

Compared with the conventional transmission mechanism, the transmission mechanism 100 of the present application at least has the following beneficial effects:

Firstly, the transmission mechanism 100 of the present application requires short machining time, and has a low manufacturing cost. Specifically, the transmission mechanism 100 of the present application achieves the transmission between the rotating shaft 112 and the eccentric shaft 108 by means of providing the planetary gearing device 151, 152, 153 on the first flange 104. More specifically, in the transmission mechanism 100 of the present application, the rotating shaft 112, the planetary gearing device 151, 152, 153 and the eccentric shaft 108 are all provided with external teeth, and the transmission is achieved by means of the engaging of the external teeth. Since the external teeth have good machinability and require short machining time, the transmission mechanism 100 of the present application has short machining time and a low manufacturing cost.

Secondly, the transmission mechanism 100 of the present application can achieve a larger transmission ratio. Specifically, in the transmission mechanism 100 of the present application, the planetary gearing device 151, 152, 153 are provided with a first row of planetary teeth 411 and a second row of planetary teeth 431, such that the transmission mechanism 100 achieves three-stage speed change. Taking the first transmission mode as an example, when $Z_a=14$, $Z_{b1}=58$, $Z_{b2}=15$, $Z_c=42$, $Z_d=125$ and $Z_e=126$, the transmission mechanism 100 of the present application can achieve the total transmission ratio I=-1460. However, the conventional transmission mechanism can generally achieve a transmission ratio less than 200.

It could be understood by those skilled in the art that, although the above embodiment comprises three planetary gearing device 151, 152, 153, the number of planetary gearing device is not limited to three, and even at least one planetary gearing device falls within the scope of protection of the present application.

It could also be understood by those skilled in the art that the number of inner wheels is not limited to two as shown in the embodiment of the present application, and a plurality of inner wheels are configured to be able to maintain a dynamic balance as a whole during the high-speed eccentric rotation.

Although in this embodiment nine connection and transfer components 110 are provided and accordingly the first flange 104 and the second flange 106 are respectively provided with nine connection and transfer components mounting holes 510 and nine connection and transfer components mounting holes 631, it could be understood by those skilled in the art that the transmission mechanism 100 is provided with at least two connection and transfer components 110, and the first flange 104 and the second flange 106 are respectively provided with a corresponding number of connection and transfer component mounting holes 510 and connection and transfer component mounting holes 631.

Although in this embodiment the connection and transfer component mounting holes 510 are counterbored holes and the connection and transfer component mounting holes 631 are blind holes, it could be understood by those skilled in the art that they may be through-holes or in other forms, as long as they can fit with the connection and transfer components 110.

Although in this embodiment the connection and transfer component 110 comprises a pin 725, a sleeve 727 and a fastener 722, it could be understood by those skilled in the art that it only needs that they can fit with the first inner wheel 131, the second inner wheel 132 and the second flange 106.

It could also be understood by those skilled in the art that although the auxiliary transfer component 120 is provided in this embodiment, the auxiliary transfer component 120 may not be provided in other embodiments.

It could also be understood by those skilled in the art that although in this embodiment the rotating shaft 112 is disposed on the right side of the first flange 104 and engages with the planetary gearing device 151, 152, 153, in other embodiments, when the power input component is disposed on the left side of the transmission mechanism 100, the rotating shaft 112 may also penetrate the internal accommodation cavity of the eccentric shaft 108, enable the left portion of the rotating shaft 112 to be connected to the power input component, and enable the rotating shaft external teeth 202 of the right portion to engage with the planetary gearing device 151, 152, 153.

Figure 12:
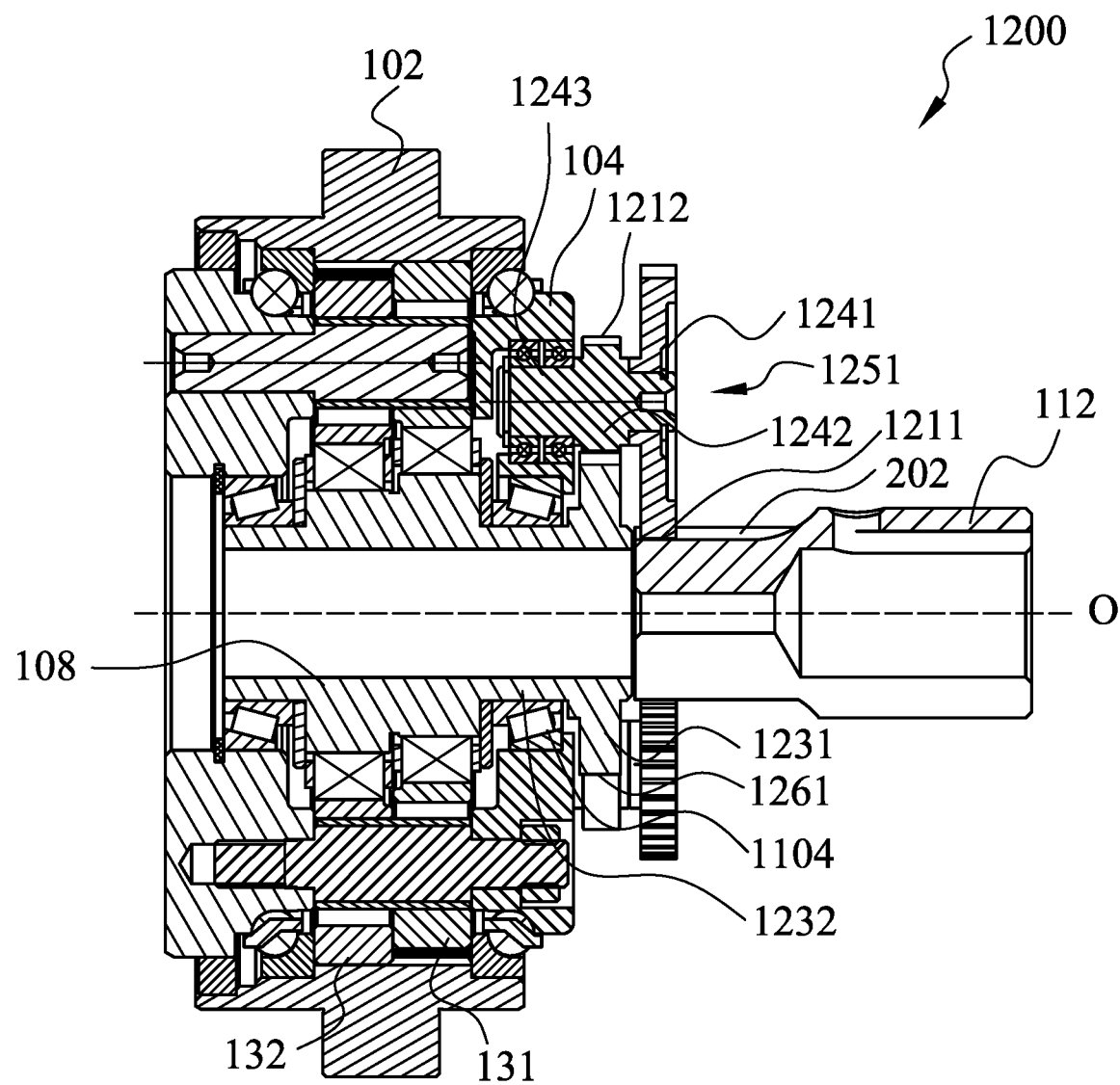
FIG. 12 shows an axial cross-sectional view of another embodiment of the transmission mechanism according to the present application.

FIG. 12 shows an axial cross-sectional view of another embodiment of the transmission mechanism according to the present application. The transmission mechanism 1200 shown in FIG. 12 is substantially the same as the transmission mechanism 100 shown in FIGS. 1A-11B. For the brief expression, the same part will not be described in detail. The difference is that in the transmission mechanism 100, the first planetary gear 401 and the second planetary gear 402 in the planetary gearing device 151, 152, 153 are disposed at two ends of the planetary gear supporting portion 421 (i.e., the first planetary gear 401 and the second planetary gear 402 are disposed on two sides of the first flange 104), and accordingly, the eccentric shaft engaging portion 310 and the first supporting portion 321 on the eccentric shaft 108 are sequentially disposed on the right side of the first eccentric portion 311. However, in the transmission mechanism 1200 shown in FIG. 12, the first planetary gear 1241 and the second planetary gear 1242 in the planetary gearing device 1251,1252,1253 are disposed on the right side of the planetary gear supporting portion 1243 (i.e., the first planetary gear 1241 and the second planetary gear 1242 are disposed on the same side of the first flange 104). The first planetary gear 1241 and the second planetary gear 1242 can rotate together, and are supported on the first flange 104 via the planetary gear supporting portion 1243. The second planetary gear 402 is disposed closer to the first flange 104 than the first planetary gear 401. The first row of planetary teeth 1211 on the first planetary gear 1241 can engage with the rotating shaft external teeth 202. Also, accordingly, the first supporting portion 1232 and the eccentric shaft engaging portion 1231 on the eccentric shaft 108 are sequentially disposed on the right side of the first eccentric portion 311. The first supporting portion 1232 is sheathed with a first flange bearing assembly 1104, such that the eccentric shaft 108 is disposed in the first flange 104. The eccentric shaft external teeth 1261 on the eccentric shaft engaging portion 1231 can engage with the second row of planetary teeth 1212 on the second planetary gear 1242.

It should also be noted that although in the transmission mechanism 100 the first flange 104 is provided with an eccentric shaft accommodation portion 508 that transversely penetrates the first flange 104, the eccentric shaft accommodation portion 508 may not penetrate the first flange 104, but being provided with a recess to accommodate the first supporting portion 321 and the first flange bearing 1104 that is sheathed over the first supporting portion 321. However, in the configuration of the transmission mechanism 1200, the first flange 104 is necessarily provided with an eccentric shaft accommodation portion that transversely penetrates the first flange 104, as such the eccentric shaft engaging portion 1231 of the eccentric shaft 108 can be disposed on the right side (i.e., the outer side) of the first flange 104 such that the eccentric shaft external teeth 1261 on the eccentric shaft engaging portion 1231 engage with the second row of planetary teeth 1212.

The embodiment shown in FIG. 12 can achieve the similar technical effects as those of the transmission mechanism 100, which will not be described in detail here.

Although only some features of the present application are illustrated and described herein, a person skilled in the art may make various improvements and changes. Therefore, it should be appreciated that the appended claims intend to cover all the foregoing improvements and changes that fall within the substantial spirit and scope of the present application.

The invention claimed is:

1. A transmission mechanism (100), comprising:
an outer wheel (102);
an inner wheel (131, 332), the inner wheel (131, 332) being disposed in the outer wheel (102), and the inner wheel (131, 332) being able to engage with the outer wheel (102);
one eccentric shaft (108), the eccentric shaft (108) capable of rotating about a central axis (O), the periphery of the eccentric shaft (108) being provided with eccentric portions (311, 312), eccentric shaft external teeth (301) and a first supporting portion (321), and the inner wheel (131, 332) being disposed around the eccentric portions (311, 312) such that the rotation of the eccentric shaft (108) is capable of driving the inner wheel (131, 332) to rotate eccentrically or such that the eccentric rotation of the inner wheel (131, 332) is capable of driving the eccentric shaft (108) to rotate;
a first flange (104), the first flange (104) and the inner wheel (131, 332) being arranged side by side, and the first flange (104) being disposed around the first supporting portion (321), wherein the outer wheel (102), the eccentric shaft (108) and the first flange (104) are positioned coaxially;
a rotating shaft (112), the rotating shaft (112) having rotating shaft external teeth (202); and
at least one planetary gearing device (151), the at least one planetary gearing device (151) being supported by the first flange (104), the periphery of each of the at least one planetary gearing device (151) being provided with a first row of planetary teeth (411) and a second row of planetary teeth (431), the first row of planetary teeth (411) engaging with the rotating shaft external teeth (202), and the second row of planetary teeth (431) engaging with the eccentric shaft external teeth (301).

2. The transmission mechanism (100) according to claim 1,
the transmission mechanism (100) is configured such that, when power is input via the rotating shaft (112), the rotation of the eccentric shaft (108) is capable of driving the inner wheel (131, 332) to rotate eccentrically, and output power via the first flange (104) or the outer wheel (102); or
the transmission mechanism (100) is configured such that, when power is input via the first flange (104) or the outer wheel (102), the eccentric rotation of the inner wheel (131, 332) is capable of driving the eccentric shaft (108) to rotate, and output power via the rotating shaft (112).

3. The transmission mechanism (100) according to claim 1, wherein
the first flange (104) comprises at least one supporting hole (504), and the at least one planetary gearing device (151) is capable of being rotatably supported on the first flange (104) via the at least one supporting hole (504).

4. The transmission mechanism (100) according to claim 3, wherein
the periphery of the eccentric shaft (108) is provided with a second supporting portion (322);
the inner wheel (131, 332) is provided with at least two inner wheel through-holes (921); and
the transmission mechanism (100) further comprises:
a second flange (106), the first flange (104) and the second flange (106) being respectively arranged on opposite sides of the inner wheel (131, 332), and the second flange (106) being disposed around the second supporting portion (322); and
at least two connection and transfer components (110), each of the at least two connection and transfer components (110) penetrating a corresponding one of the at least two inner wheel through-holes (921) in the inner wheel (131, 332), and the first flange (104) and the second flange (106) on opposite sides of the inner wheel (131, 332) being connected together;
wherein the eccentric portions (311, 312) of the eccentric shaft (108) are arranged between the first flange (104) and the second flange (106).

5. The transmission mechanism (100) according to claim 4, wherein
each of the at least one planetary gearing device (151) further comprises a planetary gear supporting portion (421), a first planetary gear (401), and a second planetary gear (402); the first planetary gear (401) is connected to the second planetary gear (402) via the planetary gear supporting portion (421); and the first row of planetary teeth (411) and the second row of planetary teeth (431) are respectively disposed on the first planetary gear (401) and the second planetary gear (402).

6. The transmission mechanism (100) according to claim 5, wherein the first row of planetary teeth (411) and the second row of planetary teeth (431) are arranged on two sides of the supporting hole (504).

7. The transmission mechanism (100) according to claim 6, wherein the first flange (104) comprises at least one planetary gearing accommodation portion (506), and the at least one planetary gearing accommodation portion (506) is disposed around a corresponding one of the at least one supporting hole (504) to accommodate the second planetary gear (402).

8. The transmission mechanism (100) according to claim 7, wherein the first planetary gear (401) and the second planetary gear (402) are disposed at two ends of the planetary gear supporting portion (421).

9. The transmission mechanism (100) according to claim 5, wherein the first row of planetary teeth and the second row of planetary teeth are disposed on the same side of the first flange (104), and the second row of planetary teeth are closer to the first flange (104) than the first row of planetary teeth;

the first flange (104) comprises an eccentric shaft accommodation portion penetrating the first flange (104); and the eccentric shaft (108) passes through the eccentric shaft accommodation portion such that the eccentric shaft external teeth are disposed on the same side of the first flange (104) as the first row of planetary teeth and the second row of planetary teeth.

* * * * *